United States Patent [19]

Rogers

[11] Patent Number: 5,734,795
[45] Date of Patent: Mar. 31, 1998

[54] SYSTEM FOR ALLOWING A PERSON TO EXPERIENCE SYSTEMS OF MYTHOLOGY

[76] Inventor: McCagie B. Rogers, P.O. Box 411556, Eagle Rock, Calif. 90041

[21] Appl. No.: 441,374

[22] Filed: May 15, 1995

[51] Int. Cl.$^6$ .......................... G06F 15/18; G06F 15/00; G06G 7/00
[52] U.S. Cl. ................................ 395/10; 395/12; 395/50
[58] Field of Search ............................ 395/10, 12, 50

[56] References Cited

PUBLICATIONS

McCagie Brooks Rogers, "Foundation for Personal-World Transformation using Expressive Arts Rhythmic Imagery via Computer Interaction." A Thesis Presented to Department of Music, California State University, Long Beach, May 1988, pp. 121–156.

Steve Aukstakalnis and David Blatner, "Silicon Mirage The Art and Science of Virtual Reality." Peachpit Press, Inc., 1992, pp. 289–291.

Howard Rheingold, "Virtual Reality." Simon & Schuster Inc., 1991, pp. 299–311.

Myron W. Krueger, "Artificial Reality II." Addison-Wesley Publishing Company, 1991, pp. 203–205; pp. 217–224.

Michael Heim, "The Metaphysics of Virtual Reality." Oxford University Press, 1993, pp. 109–128.

Michael Heim, "The Art of Virtual Reality." *Virtual Reality Special Report*, Winter 1994, pp. 9–22.

Frank J. Dyer, "Virtual Reality: Philosophical Implications of a New Technology." *The Quest*, Summer 1992, pp. 38–46.

*Primary Examiner*—David K. Moore
*Assistant Examiner*—Jeffrey S. Smith

[57] ABSTRACT

A system for allowing a person to experience systems of mythology. It includes an existential analyzer module (EAM), for assessing a portion of a person's meaningful experiential world. The EAM generates an existential descripter (EXD) data structure describing the assessments. A facilitator module (FAM) utilizes the assessment from the EXD data structure for determining at least one appropriate enactment. The FAM generates at least one enactment descripter (END) data structure describing the enactment chosen from the FAM. An enactor module (ENM) utilizes information from the EXD data structure and from the END data structure to generate a mythic virtual reality that incorporates the chosen enactment.

19 Claims, 7 Drawing Sheets

SYSTEM FOR ALLOWING A PERSON TO EXPERIENCE SYSTEMS OF MYTHOLOGY

BACKGROUND OF THE INVENTION

1. Field of the Invention

The present invention relates to virtual reality systems and more particularly to a computer-based system for allowing a person to experience systems of mythology.

2. Description of the Related Art

Each person grows up in a culture hearing tales of ancient lore involving many dimensions of experience in relationship to the environment and cosmos. This shapes how he or she views the world; it gives patterns for the situations the individual encounters throughout life.

Virtual reality is a new technology often seen as a present-day pop culture artifact. However, there is significant research underway at universities and industrial organizations in many applications of the technology. This research has led to widespread applications including architecture and design, health and medicine, education, the sciences, information control, telepresence, and entertainment. Applications in the arts and theater are emerging in many directions, with creative scenarios of visual imagery and sound, including mythological expressions and venues.

The present invention is an interactive, computer-based system allowing a person to find an alternative personal myth or system of meaning, and to move in that direction if so desired. Direct involvement with mythic systems visual imagery and sound takes place in virtual realities generated by the invention. The generated virtual realities are determined by a preceding interactive assessment of the participant's life patterns and ways of experiencing. The assessment is performed by the present invention, and assessment results are integrated within the virtual realities. As will be described below, the principles of the present invention create a vehicle for serious, mature exploration of mythic and mediational systems of experience.

The nature and import of virtual reality suggested the appropriateness of applying it to the present inventor's research. Consequently the present invention involves virtual reality in conjunction with a psychological model, called the qualitative model of personal-world emergence, based on the present inventor's master's thesis *Foundations for Personal-World Transformation Using Expressive Arts Rhythmic Imagery Via Computer Interaction* (California State University, Long Beach, May 1988, pp. 121–156). It is a unitive model of a person's psychological structure offering an original method of combining major systems of mythology and meditation (called depth systems for the model as used for the invention) with significant areas of psychological analysis and facilitation. In result it becomes possible to create "mythic virtual realities" that are based on assessment of the participant's life patterns and structure of experience. Emphasis is placed on mythic patterns and procedures or enactments from the depth systems that represent deepest purpose and unfolding of an individual's lifepath.

A great deal of research has been performed by the present inventor in attempting to understand processes of participation with mythic systems of meaning, directed to understanding how mythic systems are involved with the person's experiential world. In addition to the intrinsic value of the knowledge gained by such understanding, it is hoped this knowledge will increasingly be applied to interactive computer systems to enhance processes of involvement with mythic systems. As it matures, virtual reality technology holds great future significance for human participation with extended realities. This is the context for using virtual reality in the present invention in conjunction with the qualitative model.

The present invention is believed to be unique in combining virtual reality with mythic imagery and sound as systematically based on depth systems, and on the present invention's explicit integration of assessment and facilitation processes. There are evidently no predecessors to the present invention as a complete system. Because of this, the following paragraphs can only offer descriptions of prior art by disclosing published references representing current and foreseen kinds of virtual reality applications as they bear on aspects of the present invention. These references are accepted within the virtual reality community as reliable guides to concepts and applications.

*Silicon Mirage: The Art and Science of Virtual Reality* (Steve Aukstakalnis and David Blatner, Peachpit Press, 1992) is a widely used survey of virtual reality technology and applications. It summarizes applications in psychology (p. 292) in terms of treatment of phobias, and potential future role-playing to explore psychological roles in various situations, but indicates no complete systems more comprehensive than these areas. Applications in art are summarized (pp. 289–291) viewing virtual reality as a highly different art medium with many potential directions. For this, it mentions work at NASA Ames Research Center to create a mathematical virtual place, the possibility of virtual art galleries and the like, and the work of Myron Krueger in developing responsive environments (see below). The Banff Center for the Arts in Canada is mentioned as the leading organization exploring use of virtual reality in the arts. This book mentions no applications in drama, and does not discuss myth or imagery. Thus from the standpoints of psychology, the arts, and drama, there is no indication of virtual reality systems comparable to the present invention. Myron Krueger's work has relevancy as a precursor to part of the present invention and is discussed below. Potential relevancy of the Banff Center to the present invention is largely through the work there by Brenda Laurel in virtual theater.

*Virtual Reality* (Howard Rheingoid, Simon and Schuster, 1991) is a standard work exploring the origins, nature, and application of virtual reality. It is a broadly-based, comprehensive survey of developments worldwide, their history and potential future import, in a context of envisioning future virtual reality applications. The book approaches drama via virtual reality in a chapter entitled *Origins of Drama and the Future of Fun*, but does not suggest mythic imagery based on processes comparable to the approach of the present invention. The above chapter provides a discussion "Dionysian Cyberspaces and the Birth of Theater," pp. 299–311) of the status of virtual reality as a vehicle for drama and theater, which is somewhat of a framework for the present invention. The topics of psychology, mythology, anthropology, imagery, are not mentioned in the book's index. There appears to be no discussion in this book of present or future virtual reality systems comparable with the present invention in its comprehensive approach.

*Artificial Reality II* (Myron Krueger, Addison-Wesley, 1991) describes his development of intelligent responsive environments, considered to be significant innovations in art-based virtual environments that do not require donning special hardware devices. The book discusses (pp. 203–205) potential applications in psychotherapy (such as overcoming a negative self-image via a graphic alter ego, applying the possibility that computers can be effective as therapists for depression, and through defining realities that adapt to the patient) and diagnosis of behavioral disorders. There is discussion of applying artificial reality to audience arts and distributed, interactive and participatory theater (pp. 217–224). Krueger's work does not involve assessment of the participant's life patterns and world, nor does it involve intentional, comprehensive involvement with what are called depth systems for the present invention. Some responsive environments developed by Krueger, e.g., CRITTER and VIDEOPLACE, employ artificial-intelligence techniques; CRITTER describes rules of behavior in Conceptual Dependency Language developed at Yale to understand English. Krueger's work falls in the category of innovative art and computer-assisted responsive environments dependent on the participant's immediate actions, and not in the realm of mythic imagery and depth psychology processes integrated with assessment and facilitation.

*The Metaphysics of Virtual Reality* (Michael Heim, Oxford University Press, 1993) presents virtual reality as a major culture-changing phenomenon destined to have the widest significance, and is based on the author's awareness of virtual reality developments worldwide. Mythic imagery within virtual reality is not directly discussed in the book. The chapter entitled *The Essence of VR* (pp. 109–128) summarizes definitions of virtual reality and focusses on art aspects as the culmination of virtual reality.

*Computers As Theater* (Brenda Laurel, Addison Wesley, 1991) discusses virtual reality interfaces as based on the experiential depth and flow of dramatic performance. The analysis results in virtual reality art as productive of interactive theater. Laurel's approach makes use of artificial intelligence via expert systems, as does the present invention, but for purposes focussed on performance art involvement rather than on comprehensive assessment and facilitation leading to virtual realities for mythic purposes.

The article "The Art of Virtual Reality" (Michael Heim, *Virtual Reality Special Report*, Miller-Freeman, Winter 1994, pp.9–22) discusses art as a primary driving force and experience for virtual reality. In discussing present projects and potential future developments the article focusses on *Virtual Dervish* developed by Marcos Novak and PLACEHOLDER developed by Brenda Laurel and Rachel Strickland at the Banff Center for the Arts. These projects are relevant to the present invention in that they are analogous to enactments generated by the present invention. Neither project involves assessment or facilitation processes similar to those of the present invention. *Virtual Dervish* focusses on ecstatic experience gained through whirling dance motion, and is analogous to an enactment within the Sufi depth system of the present invention. PLACEHOLDER captures the sense of being grounded in an actual place, involving a guardian spirit characteristic of the place, through giving the participant the virtual bodies and virtual senses of spirits such as Snake, Crow, Spider, and Fish. This is analogous to a form of enactment within the Shamanism depth system of the present invention. Based on this article, there evidently are no current virtual reality systems comparable to the present invention in its overall scope involving integrated assessment, facilitation, and enaction processes utilizing the qualitative model.

The article "Virtual Reality: Philosophical Implications of a New Technology" (Frank J. Dyer, *The Quest*, Summer 1992, pp. 38–46) is perhaps the closest published description of virtual reality in conjunction with a specific depth system as in the present invention. This article compares the Buddhist concept of illusory worlds with the concept of virtual reality, suggesting that our normal world of individual experience is itself a virtual reality. Computer-based virtual realities in this vein are viewed as vehicles for future realms of experience. The article does not discuss a system similar to the present invention.

There do not appear to be current applications of virtual reality comparable to the present invention, involving broad scope of mythic depth processes, combined with integrated computer-based approaches to assessment, facilitation, and direct virtual-reality involvement.

OBJECTS AND SUMMARY OF THE INVENTION

The present invention is a system for allowing a person to experience systems of mythology. It includes an existential analyzer module (EAM), for assessing a portion of a person's meaningful experiential world. The EAM generates an existential descripter (EXD) data structure describing the assessments. A facilitator module (FAM) utilizes the assessment from the EXD data structure for determining at least one appropriate enactment. The FAM generates at least one enactment descripter (END) data structure describing the enactment chosen from the FAM. An enactor module (ENM) utilizes information from the EXD data structure and from the END data structure to generate a mythic virtual reality that incorporates the chosen enactment.

Nominally the three primary modules EAM, FAM, and ENM are executed in succession in this order, but they can also in special situations be nested for operation. Additionally there is an executive module (EXM) that is also part of the present invention.

Underlying the definition of the three primary modules and their corresponding functions is a qualitative model of world-emergence based on the present inventor's thesis. The model has been developed as a unitive view by the present inventor from his understanding of systems of mythic quest and meditation and their foundations. Such systems are collectively called depth systems in the model. The model combines the academic field of phenomenology, and its derivative application in existential analysis, with a view wherein all phenomena are numinous in origin and nature. The model interrelates subconscious processes—understood to be shaped by myth—with the continual emergence of conscious experience of inner and outer phenomena comprising a person's experiential world.

In the model, depth systems are taken to describe processes of world emergence that continually establish one's world of experience. This viewpoint also reflects adaptive organization of one's world-structure as understood by cognitive psychology. Some representative examples of depth systems are shown below in Table 1.

TABLE 1

| Example Depth Systems with Enactments | | |
|---|---|---|
| Depth System | Description | Enactments |
| Shakti System | Chakras and kundalini energy metaphors for continual world emergence. | Chakra meditations Chant, japa, intoning vedas Mystic symbols visualization Breath meditations (pranayam) |
| Shamanism | Dreamtime metaphor for emergent space and time; power; interspecies and | Shamanic masks, power symbols Assuming roles of power |

TABLE 1-continued

Example Depth Systems with Enactments

| Depth System | Description | Enactments |
|---|---|---|
| | spirit communication. | beings<br>Chanting with spirit communion<br>Meditation with Fire and Earth spirits |
| Kabbalah | Tree of Life (Etz Chaim) of mystical spheres and paths for emanation of personal world at many levels. | Paths/spheres meditations<br>Immersion within Tree of Life<br>Finding one's Tree of Life location<br>Communion with orders of beings |
| Greek Mythology | Roles and influences of Olympian and Cthonic gods, forces, humans; participation with processes of change/destiny. | Delphic oracle communion<br>Enacting roles of Greek tragedy<br>Participation with mysteries<br>Roles of Olympian gods |
| Indian Mythology | Roles and influences of Vedic gods and heros, orders of beings, individual destiny. | Dance of Shiva Nataraj<br>Involvement with extended worlds<br>Communion with Vedic sage<br>Roles of cosmic heros |
| Charismatic Christianity | Participation with Holy Ghost as messenger for healing, world transformations | Meeting patriarchs<br>Angels participation<br>Biblical prophecy<br>Laying on of hands<br>Biblical events participation |
| Monastic Christianity | Communion with numinous heavenly beings by contemplation and prayer | Gregorian chant<br>Mystic symbols visualizations<br>One-pointedness on scriptural passages |
| Jungian/Other Archetypal Psychology | Myth/dreams shaped by archetypes of collective unconscious; processes of individuation | Dream symbolisms<br>Myth symbolisms<br>Life transitions<br>New archetypal luminous images<br>Taking primal roles |
| Science Cosmology | Worldview reflecting knowledge of origins, physical principles and structure, DNA and genetics, chaos, mathematical order | Big Bang origin<br>Galaxies coalescing<br>Evolution of life<br>Gaia unfoldment<br>Primal, creation myth parallels<br>Worldview analogies |
| New Personal Depth Systems | Personal combinations of enactments; ability to shape appearance/personality of numinous mythic agents | Enactment themes of multiple systems<br>Building symbolism<br>Taking mythic roles<br>Giving visual structure/sound to aware agents<br>Mortality themes |
| Experimental Depth Systems | Crafted experience for visionary exploratory worlds; worlds based on theories of emergent consciousness | Chaos analogies<br>Guidance from future<br>Quantum physics foundations<br>Consciousness scope from proto-human<br>Artificial-life emergence processes<br>Holotropic scenarios<br>Metabiology as basis of "divine rapture" |

The model indicates (a) how the personal world may be approached through assessment using existential analysis, comparative mythology, the expressive arts therapies, and neuro-linguistic programming; (b) how mythic involvement may be based on such assessment accompanied by methods of clinical psychotherapy and counseling; and (c) how the user's mythic development may be fostered via participation in enactments. A further description of the model is provided below in the detailed description of the present invention.

In broad summary of flow through the modules, the EAM first assesses the current shape of the person's unique experiential world. The FAM then in effect connects that assessed world with enactments representing appropriate depth systems. Following this, the ENM enables participation of the user with the chosen enactments via virtual reality. The ENM can refer the person to external sources of continuing, living experience in appropriate mythic traditions.

Each of the three modules incorporates processes of artificial intelligence implemented via expert systems, neural networks, or a combination of these. For the sake of brevity, as used in this patent application, the term "expert system" refers broadly to both conventional expert systems and neural networks. The ENM involves virtual reality technology. Both the EAM and the FAM use interactive multimedia technology.

The EAM elicits the participant's responses to interactive questions, imagery, and sound patterns to gauge life patterns related to mythic aspirations. It also gauges the participant's ways of experiencing existential variables such as time, space, sound, centeredness, and patterns of emotions. The first category of assessment refers to mythic life patterning (MLP) related to personal crises, peak experiences, aspiration, and recognition of archetypal mythic situations in the person's life. MLP assessment interprets patterns from comparative mythology and performs analysis of life events. The second category of assessment refers to texture of experience (TOE) such as preferred ways of experiencing time, space, sound, centeredness, and emotional patterns. The TOE assessment uses existential analysis, expressive arts therapies, cognitive psychology, and neuro-linguistic programming. Assessment is performed by the EAM.

The FAM then uses the mythic life patterning (MLP) results, in conjunction with continuing dialogue with the user, to identify interactive enactments belonging to one or more depth systems. "Enactment" refers to an interactive procedure representing the content of a specific depth system. The term enactment is borrowed from the expressive arts therapies in reference to a client's involvement with visual and aural art processes that express and organize his or her experiential world. Illustrative enactments for several depth systems are shown above in Table 1. Enactments from the same or several depth systems are chosen in regard to assisting the person's mythic goals and aspirations. The subsequent enaction phase generates the enactments in mythic virtual realities involving the participant. Every enactment is an involvement with imagery, sound, and archetypal mythic entities and situations from a depth system; enactments involve role-playing procedures. Facilitation is performed by the FAM.

The ENM then involves the participant in the selected enactments—one or more, in succession—each in its appropriate virtual reality. Degrees of immersion in the generated environment are possible, for instance (a) via donned gloves and goggles as sensors and effectors to participate in the computer-generated virtual reality, or (b) by being in responsive, computer-controlled environments not involving the donning of special hardware, which environments are "aware" of the participant's actions. Enactments are generated in virtual realities based on the results of assessment and facilitation, by integrating within enactments the preceding texture of experience (TOE) assessment, and by expressing enactment descriptions from the facilitation process performed by the FAM. Experiential involvement within enactments is based on modes of performance art involving numinous agents and participation with them. (Numinous refers to having a sense of the sacred, according to the particular culture or system.) The enaction process is performed by the ENM.

There is also an executive module EXM that provides services to the EAM, the FAM, and the ENM. These services are tailored to the requirements of the three modules. The present invention is assumed to reside on an architecture involving one or more computer platforms. An underlying operating system (UOS)—resides on the individual platforms and offers an array of resources management services. The EXM (a) offers a standard interface to the three modules, (b) serves as an interface between the three primary modules and the UOS, (c) translates service requests from the modules to services provided by the UOS, and (d) conveys responses from the UOS to appropriate modules.

The EXM is needed as a degree of freedom between the three primary modules and the UOS. Since the three modules interface to the EXM, and not to the UOS, a change of platform or of UOS necessitates changes within the EXM but not to its interfaces with the three primary modules. Adaptation of the present invention to a new platform architecture takes place primarily by changing the EXM internally to interface to the new UOS or to the new architecture. As will be seen in the detailed description, there is one central program (EXEPOM) within the executive module that encapsulates all changes for porting in this fashion. Regardless of these internal changes, the EXM maintains the same appearance to the three primary modules. The other software modules of the present invention remain unchanged.

Inter-platform communication takes place via the UOS, which must include abilities for any needed distributed, remote operations across the multi-platform architecture. Inter-platform processes needed by the EXM take place via service calls to the UOS.

Open architecture standards apply throughout the present invention for both the development and use of all modules, and for distributed, remote operation and communication in a multiple-platform or networked case. Particular instances of the present invention can be developed in either procedurally-oriented or object-oriented fashions.

FIG. 1 shows the overall interconnection of the several modules and underlying platform, designated generally as 10. Shown are the EAM 12, the FAM 16, the ENM 20, the EXM 22, and the UOS 24, all being resident on the platform 26. The figure shows the present invention as residing potentially on a number of such platforms, forming a distributed application for which communication takes place via remote operations abilities of the individual instantiations of UOS 24.

Many applications have been identified for the present invention. These include spiritual quest, lifepath exploration and shaping, drug rehabilitation, hospice care, cross-cultural communication, performance art with scalability, information networks of mythic servers, and general virtual realities with mythic content. General application categories include self-fulfillment, psychotherapy, education, performance art, information networks, and foundations for virtual realities.

The architecture of the present invention is generic and applies to all applications such as those mentioned above. The present invention is focussed on specific applications via tailoring the content of data base files that determine expert systems rule bases and graphics and sound for user/system interaction. This is additional to choosing complementary platform hardware and software for specific applications.

It is planned that the present invention will be used at dedicated centers allowing extensive involvement for personal myth exploration. Additionally, there will be systems for homes, offices, schools, and personal portable systems. Communication between instantiations of the present invention can create awareness of the emergence of new mythic patterns and can make these available for more general, widespread exploration.

The present invention is intended to be commercially marketed under the trademark MYTHSEEKER.

Other objects, advantages, and novel features will become apparent from the following detailed description of the invention when considered in conjunction with the accompanying drawings.

BRIEF DESCRIPTION OF THE DRAWINGS

The same parts or elements throughout the drawings are designated by the same reference characters.

DETAILED DESCRIPTION OF THE PREFERRED EMBODIMENTS

Figure 1:
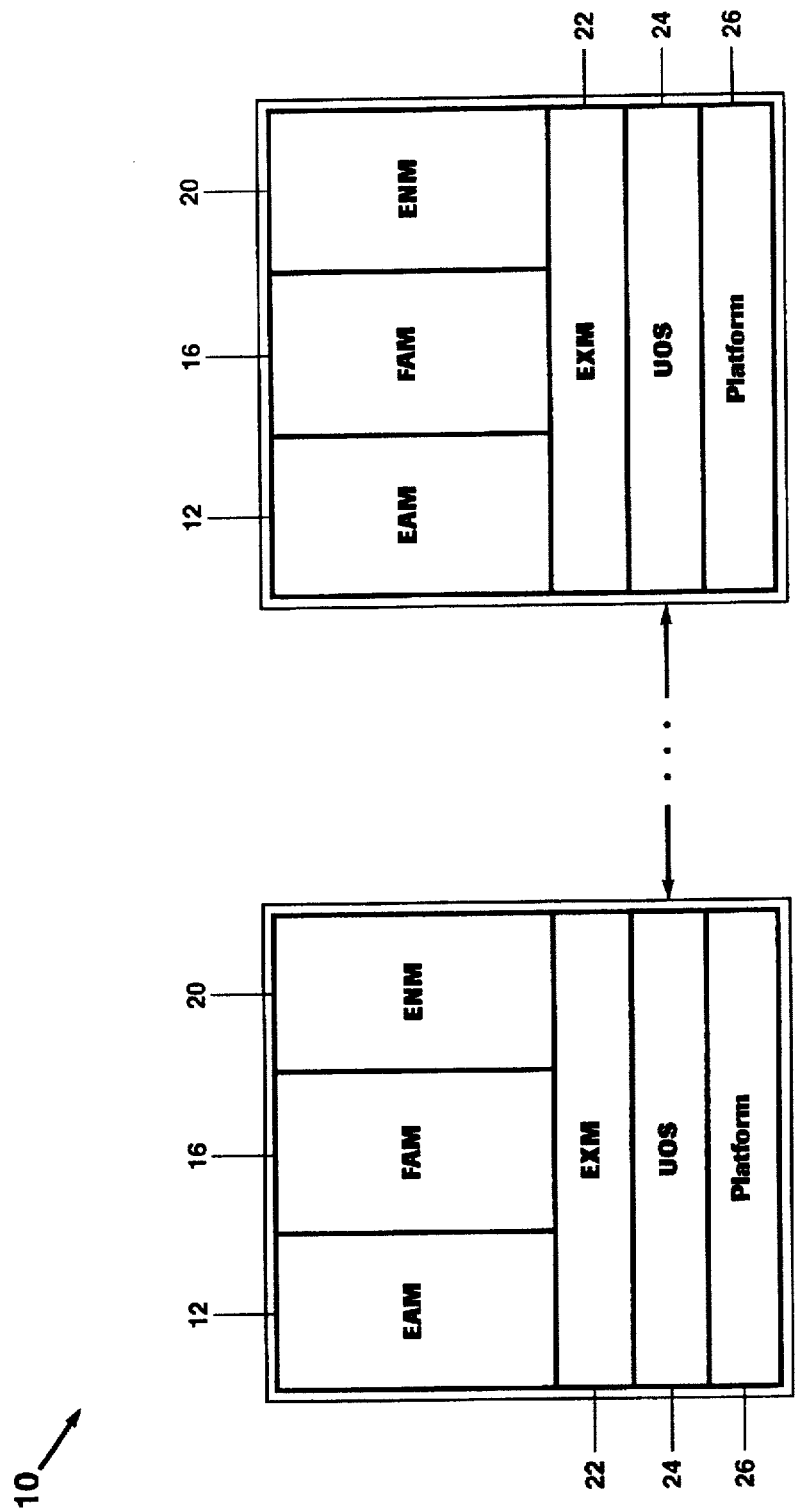
FIG. 1 is a schematic, top level, block diagram of the system of the present invention, showing potential distribution on a network of platforms.

Referring again to the drawings and the characters of reference marked thereon, FIG. 1 illustrates a preferred embodiment of the system of the present invention, designated generally as 10. An existential analyzer module (EAM) 12 assesses a portion of the person's meaningful experiential world. The EAM generates an existential descripter (EXD) data structure 14 describing these assessments.

A facilitator module (FAM) 16 utilizes the assessment from the EXD data structure 14 for determining at least one appropriate enactment. The FAM 16 generates at least one enactment descripter (END) data structure 18 describing the enactment chosen from the FAM 16. An enactor module (ENM) 20 utilizes information from the EXD data structure and from the END data structure to generate a mythic virtual reality that incorporates the chosen enactment.

Organization of Data Structures

Figure 2:
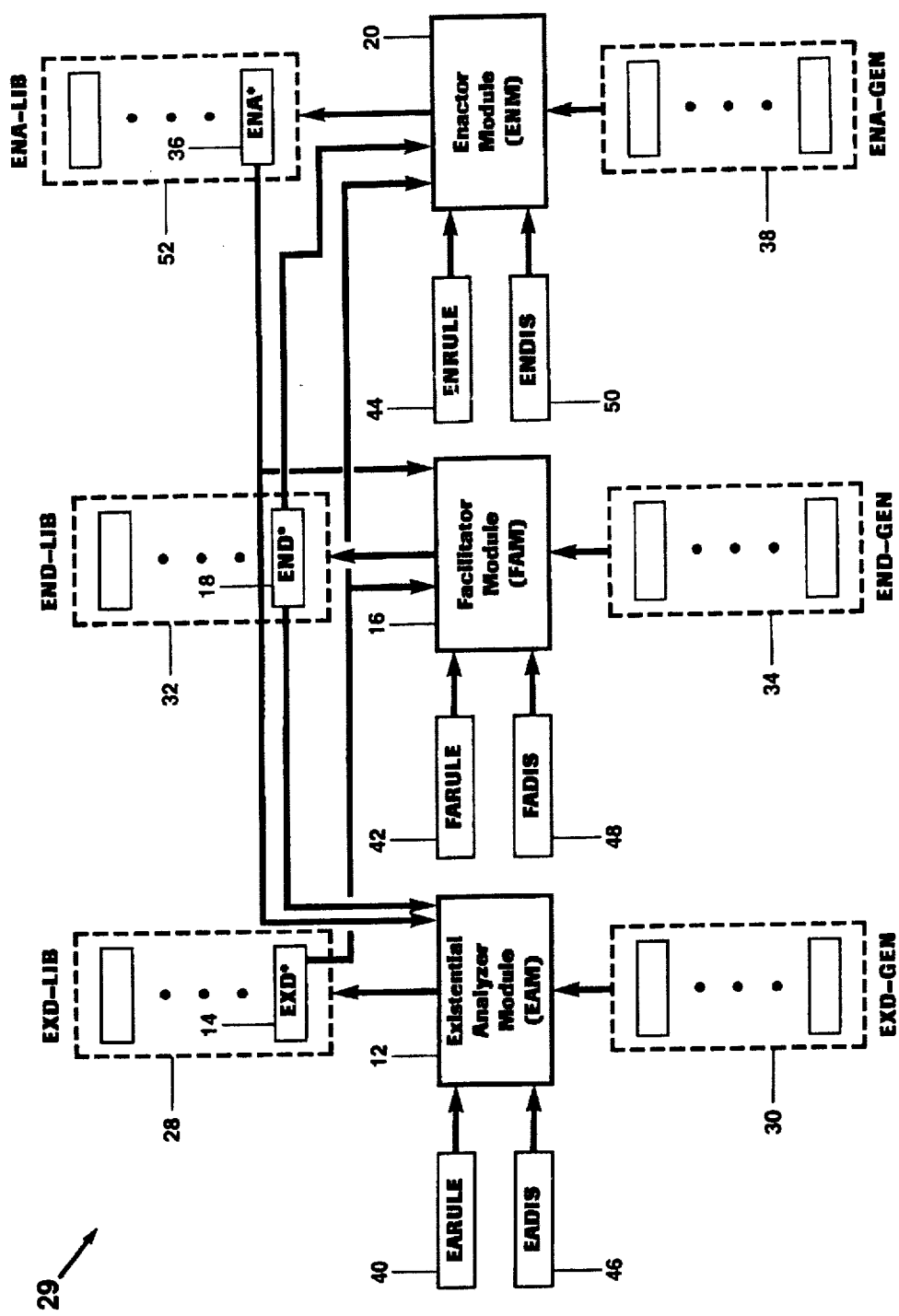
FIG. 2 is a schematic, top level, block diagram of the system of the present invention, residing on one platform.

Referring now to FIG. 2, a block diagram of the present invention is shown, illustrating residence on one platform, this embodiment being designated generally as 29. FIG. 2 shows the EAM 12, the FAM 16 and the ENM 20, and the data structures associated with them. Still in FIG. 2, an existential descriptor EXD data structure 14 is built by the EAM 12 and later referenced by the FAM 16 and the ENM 20. An EXD data structure 14 records all information about the participant as assessed by the EAM 12. Every EXD data structure 14 resides in a library EXD-LIB 28 of EXD data structures 14, as maintained over one or multiple sessions of the participant with the present invention.

An enactment descriptor END data structure 18 is built by the FAM 16 and referenced by the ENM 20 and the EAM 12. An END data structure 18 describes an enactment to be generated by the ENM 20. It is encoded in a myth-oriented language syntax to describe the enactment. Every END data structure 18 resides in a library END-LIB 32 of END data structures 18 maintained over one or multiple sessions.

There is a plurality of generic existential descriptor (EXD-GEN) data structures 30 describing canonical personal world descriptions for use in generating an EXD data structure 14. Also, there is a plurality of generic enactment descriptor (END-GEN) data structures 34 describing canonical mythic world descriptions for use in generating an END data structure 18.

For this, there is a library EXD-GEN 30 of generic forms of EXD data structures 14 that are available to the EAM 12. EXD-GEN 30 offers canonical personal-world descriptors according to dimensions such as specific culture, personality type, and archetypal mythic life patterns. There is a library END-GEN 34 of generic forms of enactments descriptor END data structures 18 that are available to the FAM 16. The END-GEN library 34 offers canonical END data structures 18 according to variables such as depth system involved, form of mythic participation, form of world suggested or required, or other structural parameters.

An enactment actualizer (ENA) data structure 36 is built by the ENM 20 to record significant aspects of the enactment as actually generated by the ENM 20. An ENA data structure 36 is referenced by the FAM 16 and the EAM 12. Every ENA data structure 36 is maintained in a library ENA-LIB 52 of ENA data structures 36 that have previously been generated. An ENA data structure 36 is linked to the appropriate EXD data structure 14 and END data structure 18 for the specific participant.

There is a plurality of generic enactment actualizer ENA-GEN data structures 38 describing canonical enactment actualizations for use in generating ENA data structures 36.

The ENA-GEN library 38 of ENA data structures 36 offers generic forms of ENA data structures 36 available to the ENM 20. These data structures are descriptions of ways in which enactments can take place in practice.

There is an expert-system rule base EARULE data structure 40 associated with the EAM 12, an expert-system rule base FARULE data structure 42 associated with the FAM 16, and an expert-system rule base ENRULE data structure 44 associated with the ENM 20. There is a digital image and sound file EADIS data structure 46 associated with the EAM 12, a digital image and sound file FADIS data structure 48 associated with the FAM 16, and a digital image and sound file ENDIS data structure 50 associated with the ENM 20.

Figure 4:
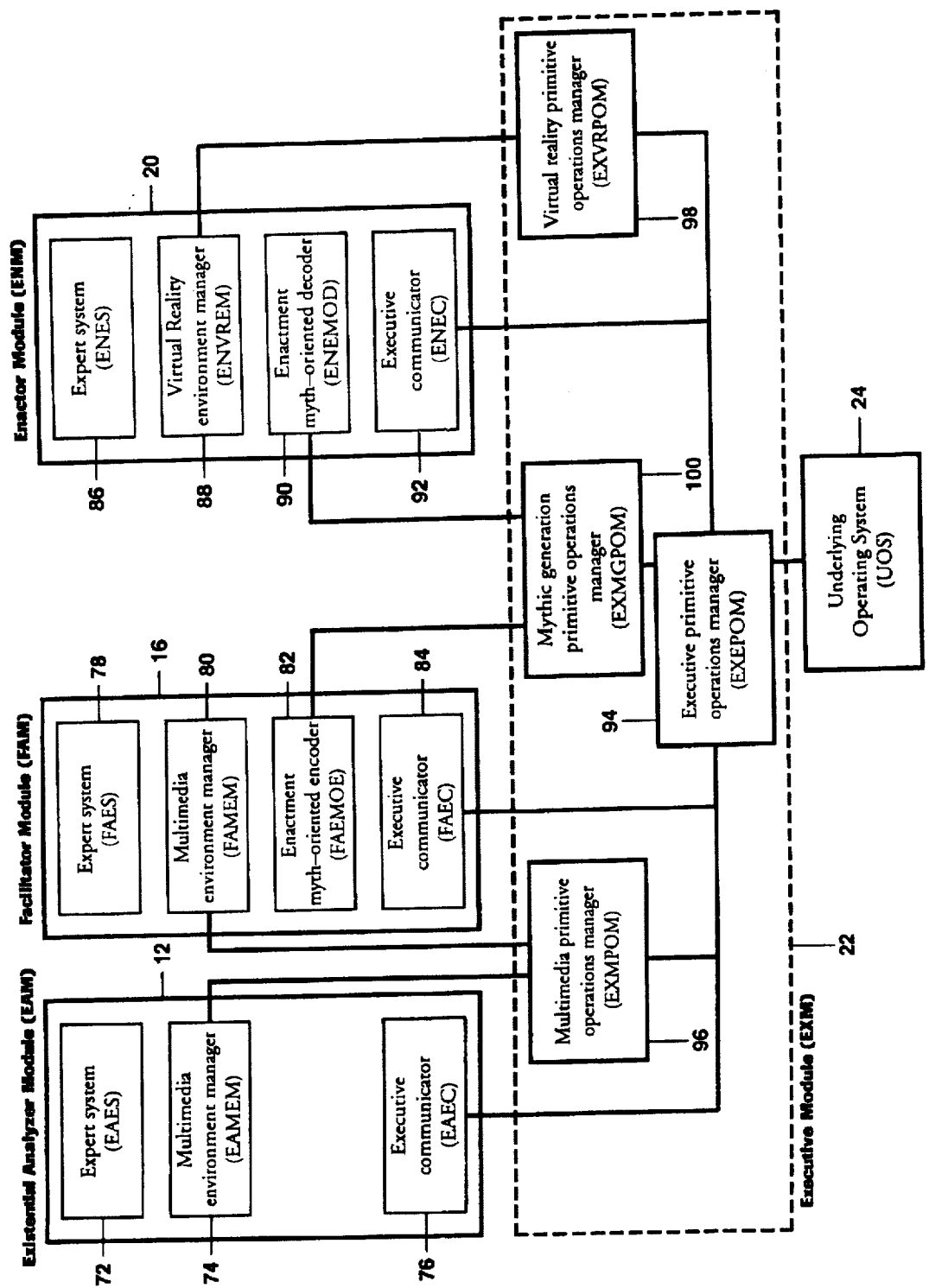
FIG. 4 is a schematic, top level, block diagram of the module structure of the present invention.

Extending this picture, FIG. 4 shows the internal module structure of the EAM 12, the FAM 16, the ENM 20, and the EXM 22, comprising the present invention, and also showing the UOS 24.

The Executive Model

Referring to FIG. 4, it can be seen that there is the underlying operating system UOS 24, and the executive module EXM 22 in communication with the UOS 24 so as to provide an internal control interface between the UOS 24 and the EAM 12, the FAM 16, and the ENM 20, with the EXM 22 providing scheduling, resources management, and enactment encoding/decoding services.

Figure 3:
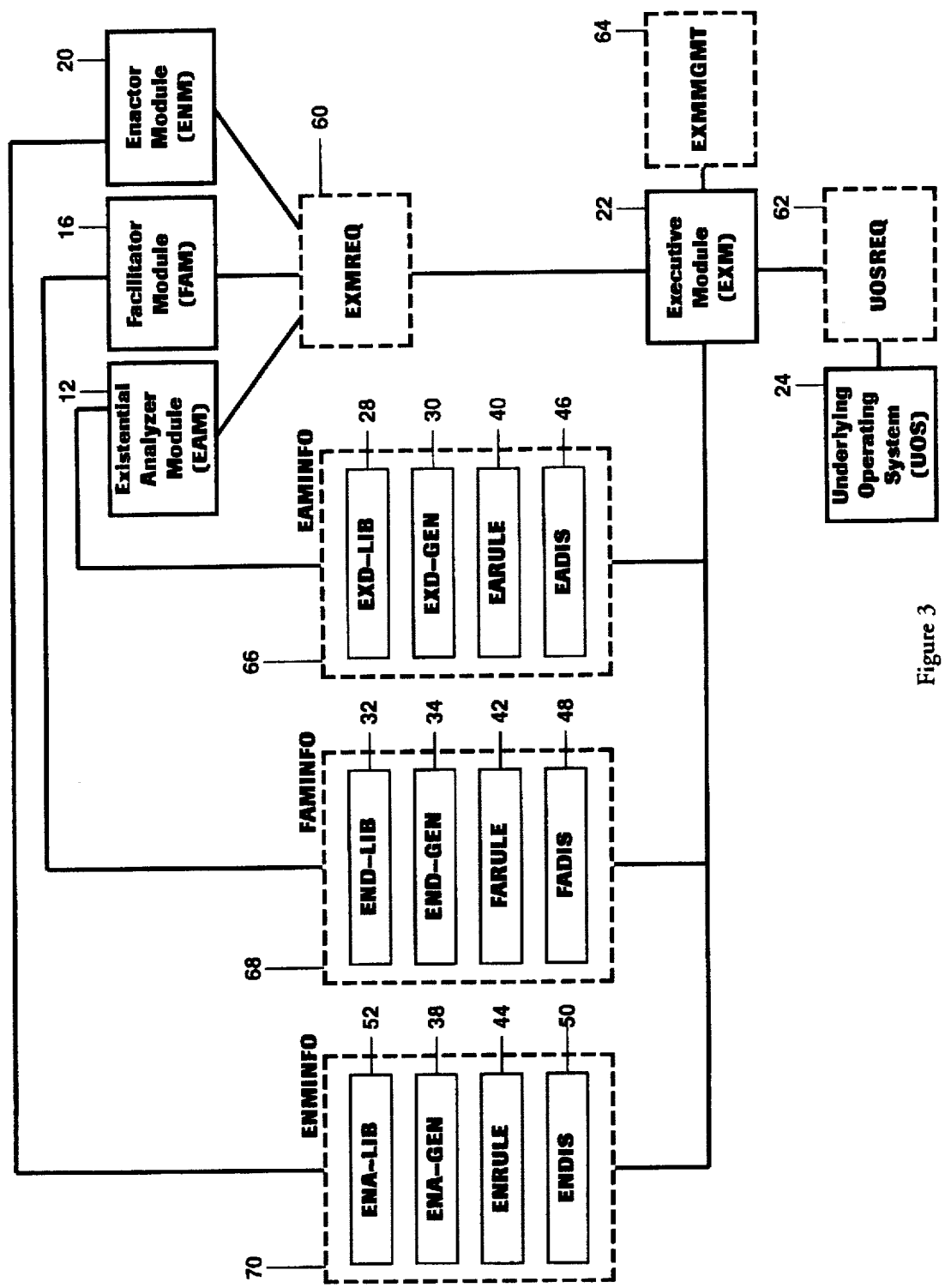
FIG. 3 is a schematic, top level, block diagram of the organization of data structures owned by the executive module.

To describe the EXM 22 and its interfaces, it should first be noted that FIG. 3 depicts the overall data structure organization for the EXM 22. This data structure organization is complementary to that shown in FIG. 2. FIG. 3 shows the EXM 22 serving as a general control interface between, on the one hand, the UOS 24 and, on the other hand, the EAM 12, the FAM 16, and the ENM 20. FIG. 3 shows the control interface between the EXM 22 and the UOS 24 implemented via a set of request queues UOSREQ 62 by which service requests are conveyed to the UOS 22 by the EXM 22, and by which responses are received by the EXM 22 from the UOS 24. In addition, FIG. 3 indicates the control interface between, on the one hand, the EXM 22, and, on the other hand, the EAM 12, the FAM 16, and the ENM 20. This control interface is implemented via a set of request queues EXMREQ 60 by which service requests are conveyed to the EXM 22 by the EAM 12, the FAM 16, and the ENM 20, and by which responses are received by these same modules from the EXM 22. Also shown in FIG. 3 is a set of management data structures EXMMGMT 64 used internally by the EXM 22 to manage processing resources such as tasks, memory, processors, data structures, remote operations and use of transmission capacity. The EXM 22 is considered to be the owner, for configuration allocation and management purposes, of all data structures used by itself or by other modules. To say that a data structure is owned by EXM 22 means that EXM 22 has authority to create or de-create the data structure, and to take action in the event of reconfiguration or failure recovery. The data structures owned by the EXM 22 include the set of request queues EXMREQ 60 and the request queues UOSREQ 62. Additionally, the owned data structures include sets of all data structures used directly by the three primary modules: specifically, these are the EAMINFO data structure 66 for the EAM 12; the FAMINFO data structure 68 for the FAM 16; and the ENMINFO 70 data structure for the ENM 20. The EAMINFO data structure 66 includes the EXD-LIB library 28, the EXD-GEN library 30, the EARULE rule base 40, and the EADIS data structure 46, shown as used by the EAM 12. The FAMINFO data structure 68 includes the END-LIB library 32, the END-GEN library 34, the FARULE rule base 42, and the FADIS data structure 4.8, shown as used by the FAM 16. The ENMINFO data structure 70 includes the ENA-LIB library 52, the ENA-GEN library 38, the ENRULE rule base 44, and the ENDIS data structure 50, shown as used by the ENM 20. The EAM 12, the FAM 16, and the ENM 20 can use the above sets of data structures only through authority being granted by their owner, the EXM 22. This authority is normally granted when the system is initially configured dynamically, and when the system becomes dedicated dynamically to the specific participant. Thus the EXM 22 has authority to control when and in what circumstances all data structures are utilized taking failure/recovery considerations into account.

Referring to FIG. 4, the EXM 22 comprises, first, an executive primitive operations manager EXEPOM 94 for providing a basic set of operations to drive operating system executive services. Second, there is a multimedia primitive operations manager EXMPOM 96 that provides a set of operations to manage user multimedia interfaces. Third, there is a virtual reality primitive operations manager EXVRPOM 98 for providing a basic set of needed operations to manage user virtual reality interfaces. Fourth, there is a mythic generation primitive operations manager EXMGPOM 100 to provide a basic set of operations needed for three functions: (a) to encode enactment descriptions for the FAM 16, (b) to decode enactment descriptions for the ENM 20, and (c) to determine and suggest enactment entities and events that are consistent with the depth system in force for a mythic virtual reality being generated by the ENM 20.

Figure 5:
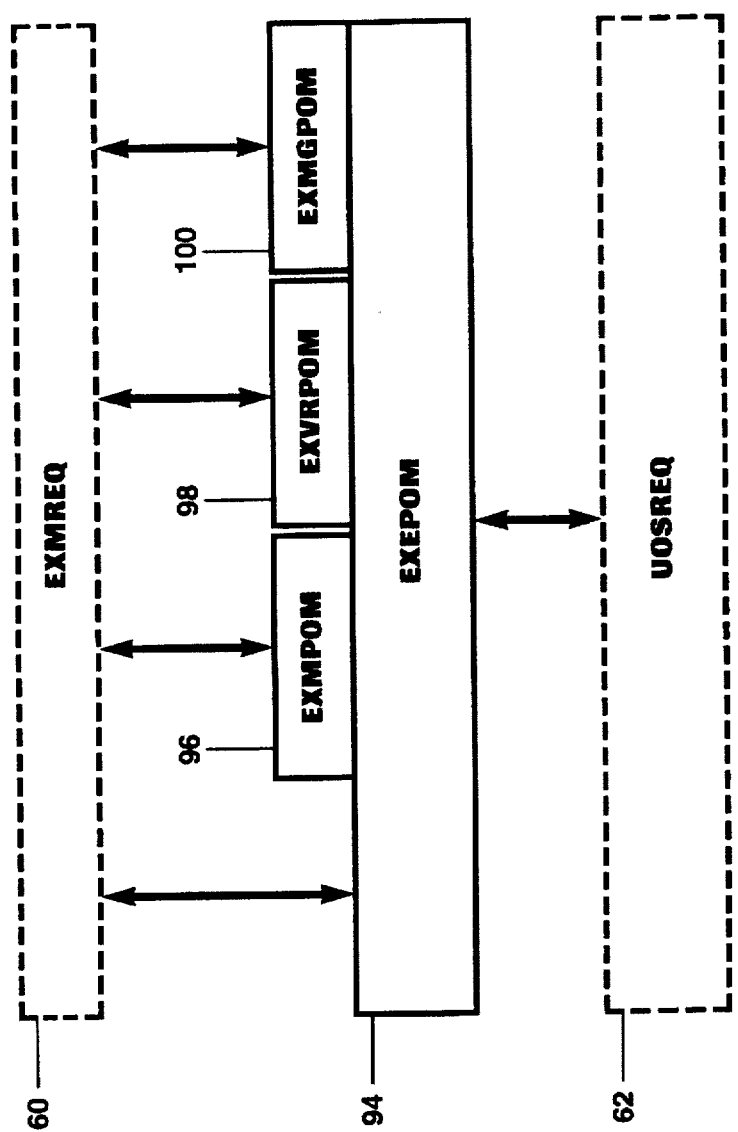
FIG. 5 is a schematic block diagram of the internal architecture of the executive module.

Internal architecture of the EXM 22 is shown in FIG. 5. Referring to that figure, EXEPOM 94, EXMPOM 96, EXVRPOM 98, and EXMGPOM 100 are interface programs that receive service requests for their respective service areas from the EXMREQ executive request queues 60. EXMPOM 96, EXVRPOM 98, and EXMGPOM 100 perform processing unique to their service areas; they also drive EXEPOM 94 for executive services involving the UOS 24, via UOSREQ request queues 62. Thus EXEPOM 94 is the only program interfacing to the UOS 24 (via UOSREQ 94). This also means that EXEPOM 94 is the only portion of the present invention's software that needs to change in compensating for residency on a new UOS 24 or a new platform 26. Its interface to EXMPOM 96, EXVRPOM 98, and EXMGPOM 100 does not change for a new UOS 24 or a new platform 26, only its internal structure is subject to change for this purpose. Porting of EXEPOM 94 is by internal changes.

Executive Primitive Operations Manager (EXEPOM)

Executive primitive operations include management of tasks and processors, memory management, database operations, input/output, user/system interface control, configuration management, and remote operations including transmission capacity management. These services are performed by EXEPOM 94 as based on services available from the UOS 24. EXEPOM 94 is an intermediary for such services needed by other software entities comprising the EAM 12, the FAM 16, and the ENM 20, as well as other parts of the EXM 22 consisting of the multimedia primitive operations manager EXMPOM 96, the virtual reality primitive operations manager EXVRPOM 98, and the mythic generation primitive operations manager EXMGPOM 100, described below. EXEPOM 94 performs processing for requested operations and issues requests as needed to the UOS 24 via the UOSREQ 62 request queue, also receiving responses as necessary from the UOS 24. The phrasing and structure of these requests depends on services available from the particular UOS 24 being used.

A module is activated via a request delivered to that module (the target module for the request) by EXEPOM 94 via UOS 24 services. The request was itself issued dynamically to EXEPOM 94, again via UOS 24 services, by another module (the source module for the request). Information and parameters within the request are read by the target module to determine what to do to accomplish the requested operation.

The EAM 12, the FAM 16, and the ENM 20 form a functional trio. Each module is able to invoke either of the others to accomplish needed functions. The modules request services of one another in a dynamic environment and are activated and deactivated by EXEPOM 94.

Figure 6:
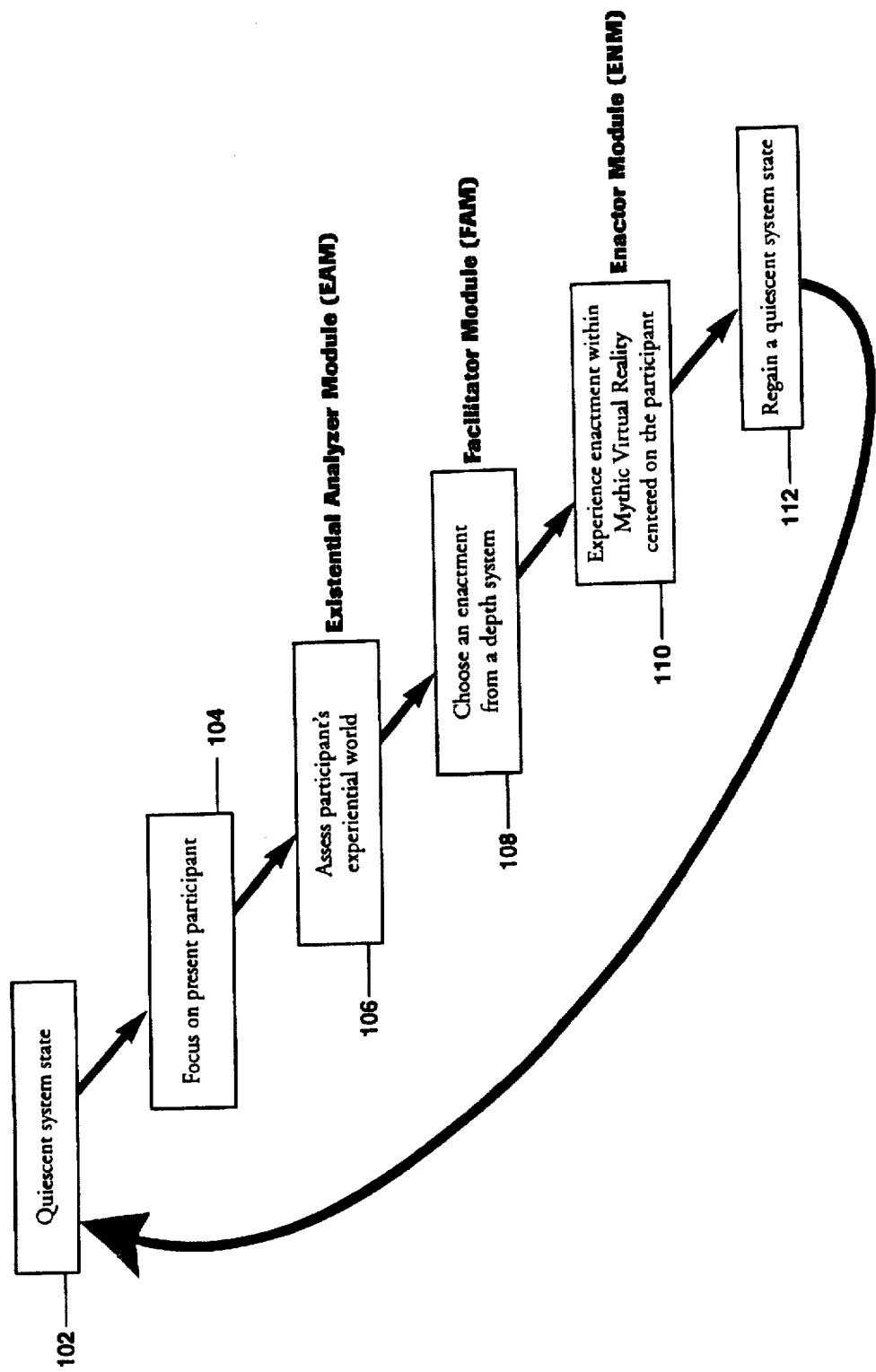
FIG. 6 illustrates the principal control path of the present system.

FIG. 6 illustrates the principal activation control path of steps for a given participant. The figure shows the following steps:

102 Establish a quiescent system control state in regard to the present participant.

104 Enter and configure the dynamic system control environment, including the EXM 22, from a quiescent state to establish focus on the present participant.

106 Run the EAM 12 interactively to assess the participant's experiential world, both the MLP and the TOE aspects.

108 Run the FAM 16 to facilitate a series of one or more enactments based on the preceding assessment and further interaction with the participant.

110 Run the ENM 20 to generate a series of mythic virtual realities, each incorporating one enactment as based on the series of enactments reflecting assessment and facilitation results.

112 Reconfigure the dynamic system control environment, including the EXM 22, to remove focus on the present participant to achieve (or return to) a quiescent system control state.

The first step is ordinarily performed by EXEPOM 94, which also invokes the subsequent steps either by its own initiative or through requests received from other modules or programs. This is the nominal path for the invention's flow for the given participant. However, a module can request that execution of another module be invoked during the course of the former's execution, i.e., the requested module is embedded beneath the requesting module. This is the case, for instance, if assessment needs to involve a trial mythic virtual reality, i.e., referring to the circumstance in which enaction is embedded within assessment. Thus, each of the three main modules is allowed to request the services of either of the other two main modules as needed to perform the function of the present invention. This creates a local ordering within the principal control path. The forms of embedding allowed are shown below in Table 2.

TABLE 2

Function Interactions Among Modules

| Calling Module* | Called Module* | | |
| --- | --- | --- | --- |
| | Existential Analyzer | Facilitator | Enactor |
| Exist'l analyzer | Recursive development of assessment aspects. | Select and present enactments. | Generate partial virtual reality. |
| Facilitator | Perform incremental assessment. | Recursive development of facilitation aspects. | Generate partial virtual reality. |
| Enactor | Perform incremental assessment. | Select and present enactments. | Recursive development of assessment-related embedded aspects. |

Embedded Request Calls by the Existential Analyzer

The EAES 72 can run the FAES 78 in an incremental mode to select and present enactments during the course of assessment. Similarly, the EAES 86 can run the ENES 86 to generate a partial virtual reality, i.e., a virtual reality including only part of what might subsequently be generated by the ENM 20 in a complete sense. This allows immersive trial of existential world parameters. The EAES 72 can also invoke itself for recursive development of assessment aspects, i.e., hierarchical assessment processes can be built dynamically to allow parallel aspects of assessment. In summary, trial virtual realities can be used, and partial facilitation can be performed, during assessment.

Embedded Request Calls by the Facilitator

The FAES 78 can run the EAES 72 to perform incremental assessment for additional existential assessment information needed for the facilitation; or the FAES 78 can run the ENES 86 for a partial virtual reality to try aspects of involvement for the participant. The FAES 78 can invoke itself for recursive convergence toward desired enactments. Thus assessment can take place in facilitation, and virtual realities facilitation.

Embedded Request Calls by the Enactor

The ENES 86 can cause an incremental assessment, via the EAES 72, to change or sharpen aspects of a mythic virtual reality for the participant; or the ENES 86 can cause an incremental facilitation by execution of the FAES 78. The ENES 86 can invoke itself for recursive development of embedded enactments. Thus incremental assessment or facilitation can be invoked during the course of involvement with a mythic virtual reality.

Forms of User Interfaces

A form of interface is associated with each primary module other than the EXM 22, that is, with the EAM 12, the FAM 16, and the ENM 20. This refers to the primary form of interface established between the software system and the participant for the course of execution of a given module. The three broad forms of interfaces are multimedia (MM), virtual reality (VR), and null (NU, meaning the absence of the other interfaces, MM or VR). The associations of interface types with modules are as follows:

MM is associated with the EAM 12

MM is associated with the FAM 16

VR is associated with the ENM 20

Each module, when activated by the EXEPOM 94 in response to a function call by a module (either another module or the module itself), establishes the associated form of interface. Thus:

the EAM 12 establishes an MM interface the FAM 16 establishes an MM interface the ENM 20 establishes a VR interface In the basic primary flow of control between modules, we have:

03EAM→FAM→ENM→0 where the quiescent state 0 establishes the null interface, NU. Thus, in terms of primary module flow, the following flow of interfaces is established:

NU→MM→MM→VR→NU

Establishing a type of interface includes specifying an appropriate digital image and sound file for the module: thus the EADIS file 46 is established for the EAM 12, the FADIS file 48 is established for the FAM 16, and the ENDIS file 50 is established for the ENM 20. EADIS 46 and FADIS 48 establish an interactive multimedia interface, while ENDIS 50 establishes a virtual reality interface. These files have complex internal structures as appropriate to their interactive, real-time utilization, determined by the particular implementation of the present invention. ENDIS 50 internally reflects differences between forms of virtual reality, including those that are completely immersive, partially immersive, or immersive in the sense of involving intelligent, responsive environments that do not physically encumber the participant.

In the case of local variations to this flow, a given module can call either of the two others or it can call itself. Each such call, implemented via the ENM 22, causes the called module's interface to be established in a way such that the calling module's interface is reestablished upon return. For example, the EAM 12 can invoke (via the EXM 22) the ENM 20. This would correspond to creating an "immediate" virtual reality by the ENM 20 as part of the assessment process. Thus the EAM 12 has established MM; the ENM 20 then establishes VR, which remains in effect during the course of operation by the ENM 20, and MM is reestablished upon control returning to the EAM 12 after operation of the ENM 20.

Similarly, the EAM 12 can invoke the FAM 16; the FAM 16 can invoke the EAM 12; the FAM 16 can invoke the ENM 20; the ENM 20 can invoke the EAM 12; and the ENM 20 can invoke the FAM 16. Each of these invocations takes place and terminates during dynamic execution of the calling module. With this in mind, e.g., the EAM 12 calling the FAM 16 is different than for the principal activation control path, because in the former case control is returned to EAM 12 with its interface restored, whereas in the latter neither is true, i.e., control is not returned and the interface is consequently not restored. There are boundary cases for "nesting":

EAM→EAM

FAM→FAM

ENM→ENM

Nesting here defines subinterfaces, so that the first case creates a nested interface of the same type (both are MM), with return of the first (embedding) interface when control is returned. The same statement pertains to the second case. The third case creates a VR subinterface, with return to the embedding interface upon return of control to the ENM 20.

Multimedia Primitive Operations Manager (EXMPOM)

Multimedia primitive operations are concerned with use of graphical user interfaces (GUIs) with the user, in conjunction with management services offered by the UOS 24. These are standard operations for presenting multimedia information (text, graphics, still video, moving video, animation, sound) and receiving the responses of the participant. Multimedia procedures may involve either windowing or non-windowing architectures, since increasingly sophisticated interfaces will be needed for subtlety of assessment and facilitation. EXMPOM 96 also offers functional services needed for creating special visual and sound processes required by assessment and facilitation. EXMPOM 96 processes requests for these higher level services into lower level requests available from EXEPOM 94. EXMPOM 96 responds to requests from EXMREQ 60 for multimedia operations, and communicates with EXEPOM 94 to accomplish these operations. Thus EXMPOM 96 is a front end for performing requested interactive multimedia operations. EXMREQ 60 requests for EXMPOM 96 are received primarily from the EAM 12 and the FAM 16, but can also be received from the ENM 20. Additionally, there can be special requests for purposes of initialization or failure recovery. Multimedia initialization requests, such as for creating a quiescent system control state, may be issued to EXMPOM 96 by EXMPOM 96 itself.

Virtual Reality Primitive Operations Manager (EXVRPOM)

Virtual reality primitive operations are concerned with the use of virtual realities for the participant as based on services offered by the UOS 24. These are operations for sensing parameters describing the participant'location, orientation, movement, and informational preferences; and for generating visual imagery and sound patterns as aspects of the mythic virtual reality being generated. EXVRPOM 96 responds to requests, received via the EXMREQ 60 request queues, for virtual reality operations; it processes the requests, and drives EXEPOM 94 to accomplish needed resources management operations. In this sense EXVRPOM 98 is a front end for performing requested virtual reality operations. Higher-level virtual reality requests are processed by EXVRPOM 94 into lower-level requests available from EXEPOM 94. This same approach applies to virtual reality implemented either via donning specialized interface sensors and effectors (the encumbered case) or via involvement with responsive environments that do not require donning specialized interfaces (the unencumbered case). EXMREQ 60 requests for EXVRPOM 96 are nominally from the ENM 20, but can also be issued by other software entities for purposes of initialization or failure recovery. Virtual reality initialization requests, such as for creating a quiescent state, may be issued directly within EXEPOM 94. Mythic Generation Primitive Operations Manager (EXMGPOM).

EXMGPOM 100 provides services in three areas: encoding enactment descriptions in myth-oriented language syntax; decoding enactment descriptions written in myth-oriented language syntax; and presenting/suggesting requested entities and parameters for the content of mythic enactments. All of these occur as controlled by the fact that a specific depth system, as determined by ENM 20, is in effect at the given time.

Encoding enactment descriptions. EXMGPOM 100 offers a set of parameterized services to specify agents, entities, events, situations, and experiential qualities of enactments. Requests for encoding services are issued by the FAM 16 to build an enactment descriptor END data structure 18 during the facilitation process. The result of a request is that the associated element is established within an enactment being described within the appropriate END data structure 18. This is done in a generic way applicable to all enactments within all depth systems (those recognized as such for the present invention). Such encoding is done in a way that is legitimate for and consistent with the depth system for which the enactment is being built (the depth system that is in effect at the given time). The enactment description takes the form of a script written in the myth-oriented language syntax. EXMGPOM 100 receives EXMREQ 60 requests for encoding enactment descriptions nominally from the FAM 16.

Decoding enactment descriptions. EXMGPOM 100 offers a set of parameterized services to interpret specified agents, entities, events, situations, and experiential qualities in existing enactment scripts written in the myth-oriented language syntax used for encoding. Requests for decoding services are issued by the ENM 20 in the course of generating a mythic virtual reality, stepping through an existing enactment script during the course of the enaction process. The result of a request is that a "next portion" of an enactment being generated is decoded from the appropriate END data structure 18, and provided to the requestor. This is done in a generic way that represents the overall structure of all enactments for all depth systems (those recognized as such for the present invention). Such decoding is done in a way that is legitimate for and completely consistent with the content of the depth system for which the enactment has been built. EXMGPOM 100 receives EXMREQ 60 decoding requests nominally from the ENM 20.

Providing elements for mythic enactments. This third kind of call dovetails with the preceding two. Generic descriptions of depth systems and related enactments are available on-line from the END-GEN library 34 of canonical END data structures 18. EXMGPOM 100 offers a set of services to look-up and return descriptions of agents, entities, events, situations, and experiential qualities for given depth systems and related enactments. This is a method to ensure that enactments in virtual realities are completely consistent in terms of the depth systems they represent. In effect this approaches a way to create "mythic worlds" based on the content and assumptions of depth systems. EXMGPOM 100 receives EXMREQ 60 requests to provide enactment elements nominally from two sources: the FAM 16 for specifying enactments; and the ENM 20 for examining and generating alternatives unfoldings within virtual realities. The ENM 20 receives detailed descriptions of elements of enactments identified from the current enactment descriptor END data structure 18.

The Existential Analyzer Module

Referring to FIG. 4, there is an existential analyzer expert system (EAES) 72 for providing assessment of the participant's meaningful experiential world. There is also an existential analyzer multimedia environment manager (EAMEM) 74 in communication with EXMPOM 96 for providing an EAM 12 portion of a multimedia interface between user and the EAES 72. Additionally there is an existential analyzer executive communicator (EAEC) 76 in communication with EXEPOM 94 for providing a control interface between the EAM 20 and the UOS 24.

Existential Analyzer Expert System (EAES)

Referring again to FIG. 4, EAES 72 is a rule-based expert system that accomplishes the functionality of the EAM 12. The rule base for EAES 72 is the file EARULE 40. EAES 72 first establishes a multimedia environment with the participant, i.e., with appropriate windowing or non-windowing regimes, graphical user interfaces, and other modes of interaction. The EADIS digital image and sound file 46 is established for use across the interface. Assessment is performed of mythic patterns in the participant's life experience, and the participant's ways of experiencing existential variables are assessed. EAES 72 involves the participant in assessment via interactive multimedia operations accomplished by calls to the multimedia environment manager EAMEM 74, which in turn phrases and issues calls as necessary to the EXM 22. EAES 72 accomplishes internal executive services needed during assessment by calls as necessary to the executive communicator EAEC 76, which in turn phrases and issues calls to the EXM 22. The results of the assessment are written into an existential descriptor EXD data structure 14 for the present participant. The EXD data structure 14 can reference generic existential descriptor data structures in the library EXD-GEN 28 of such data structures. Either a new EXD data structure 14 is created if this is the participant's first session with the present invention; or an existing EXD data structure 14 for the participant is updated if it is not the first session for the participant.

The EAM 12 utilizes information from at least one END data structure 18 for generating the EXD data structure 14.

This situation arises since EAES 72 can embed instances of the FAM 16 to obtain immediate suggestions for possible enactments from a partial facilitation process (performed by the embedded instances of the FAM 16); similarly, instances of the ENM 20 may be embedded to create immediate partial mythic virtual realities for trial during the course of assessment being performed by the EAES 72.

EAES 72 can also embed instances of itself in order to initiate concurrent or parallel aspects of assessment. Such embedding operations take place via calls to EAEC 76 and resultant calls by EAEC 76 to EXEPOM 94 in the EXM 22.

The EAES 72 assesses mythic life patterns (MLP) in the person's history, interactively using comparative mythology and existential analysis. Also, EAES 72 assesses the person's texture of experience (TOE), interactively applying existential analysis and the expressive arts therapies.

These assessment functions are performed by two parts of EAES 72: the first works patterning user's mythic life patterning, MLP; the second works with the user's texture of experience, TOE, such as ways of experiencing time, space, centeredness, sound, and emotive structure. These two parts are independent of one another, i.e., are used individually with neither depending on use of the other. EAES 72 makes use of its associated rule base data structure EARULE 40 to perform both the mythic life patterning MLP assessment and texture of experience TOE assessment using artificial intelligence processes.

Assessment performed by EAES 72 approaches mythic life patterns and texture of experience only in abbreviated form as needed to identify essential patterns for assessment. This is complemented by ability for fuller assessment via specialized depth systems in the enaction phase. Assessment is intended to be a relatively minimal process covering all areas needed in kind, but that defers extensive exploration of an assessment nature until the enaction phase. The reason for this approach is to prevent assessment-phase processes from becoming excessive, and allowing lengthy, extended assessment to take place in the enaction phase where they naturally belong in a design sense. There is no resulting loss of generality since EAES 72 has ability to embed ENM 20 instances, i.e., depth systems and enactments that can be specialized for performing broader functions of assessment.

Either TOE or MLP assessment normally elicit user responses whose analysis is of a closed-loop nature whereby responses can be completely interpreted and recorded by software without intervening interpretation by a human analyst. Closed-loop interpretation would typically be the case for home or office systems, or personal portable systems, that implement the present invention. Additionally there are responses needing interpretation of an open-loop nature whereby the responses—due to their complexity or subtlety—must be interpreted by a human analyst, with the results then being given to software for recording. Open-loop interpretation would typically take place at specialized centers having extended resources that implement the present invention. EAES 72 includes a means of (a) cessating immediate control to enable open-loop interpretations, and (b) of subsequently regaining control with acceptance of information to complete open loop evaluations.

MLP Assessment

EAES 72 collects information about factors in the person's life history. Mythic life patterning, the subject of MLP assessment, can be approached by finding facts, events and patterns in the person's life that are either suggestive of personal myth or significant for promoting the person's mythic development. The first form of inquiry for MLP assessment ascertains factors such as the following, with variations being determined by the person's detailed history:

1. Being raised in or living in a certain culture with its patterns of meaning.
2. Being raised in or living in a particular faith or religion, potentially attracting or repelling the participant.
3. Interest in specific religions, spiritual teachings, systems of meditation, "mystery" or arcane symbolism.
4. Interest in areas of world mythology - creation, nature, destiny, aspiration, ritual, cosmology.
5. Interest in particular philosophies - secular or religious -- related to meaning of life, cosmology, individual origin, nature, destiny, aspiration.
6. Attraction to or repulsion by particular heroic, epic, or historical figures (both heroes and anti-heroes) at critical ages or stages of development.
7. Historical events that attract or repel.
8. Attraction to particular expressive styles of music or liturgy, or musical venues, "getting to personal roots".
9. Interest in particular styles of art, iconography, or expressive imagery, including architecture, sculpture, and painting, relating to personal depth of meaning.
10. Personal events the person finds threatening, ennobling, fascinating or repelling.
11. Events or patterns that have arisen for the person in psychotherapy or personal growth workshops or programs.
12. On-going life events and involvements related to striving, meaning, and openness to the future.
13. Patterns of personal events related to unfolding of the individual's life and aspirations.
14. Preferred communications styles such as primary orientation to visual, sound, or kinesthetic information, as suggested by neuro-linguistic programing; this focuses on suitable modes of involvement.

The second form of inquiry for MLP assessment is concerned with archetypal patterns of life existing within depth systems as they pertain to the participant's significant life events and aspirations. This process makes use of the EXD-GEN 30 library of generic existential descriptors. The result of this assessment is knowledge of patterns in the person's life that potentially pertain to particular depth systems.

TOE Assessment

Texture of experience (TOE) assessment refers to how the person structures and experiences-world as manifested in specific ways of experiencing time, space, sound, existential centeredness, and feelings. Texture of experience variables are understood and bracketed by existential analysis. Appropriate techniques for this kind of assessment also exist in the expressive arts therapies. Assessment is approached by participant responses to nuances of visual imagery and sound structures. To this end, the depth systems themselves should be used as much as possible to suggest forms of involvement based on their unique individual typologies of participants. Jungian archetypal psychology would use its four functions; Hindu or Jain systems could use the major yogas (jnana, bhakta, karma, raja, mantra), or the Jain Arhum mantra of mantric seed sounds. Since an appropriate depth system is not determined during the assessment phase (such determination takes place in the facilitation phase), a range of typologies is considered in developing TOE assessment data for the participant.

Centeredness refers to visceral feelings of an existential texture of support, or its lack; it is related to a person's inner sense of existential groundedness, a changing experiential mixture of being and nonbeing. This is not the same as "centeredness" in the martial arts, but rather is an awareness of connectedness with the ground-of-being.

The following outlines representative forms of experience as elaborated by the participant's unique circumstances.

Experiencing time. The participant's ways of experiencing time are approached via assessing the following possibilities:

1. Linear, mathematical time from past to present, with uniform flow (this is nominal time flow that most people assume).
2. Historical time for which time proceeds from an origin to a destination (uniform flow with historically-fixed endpoints).
3. Cyclic time in which world events and processes repeat: this can be for the personal-world of the participant's inner experience, or for the global-world of outer experience.
4. Rhythmic, varying pace of time-unfoldment; the participant chooses an appropriate contour.
5. Rapid time flow with events impulsive, or slow time flow with events gradual (the participant can set rate of rapidity or slowness).
6. Speeding up, or slowing down, of time flow based on changing personal dynamics (with varying rate of change of time flow).
7. Collapsing the information content of extended periods into brief periods.

8. Subjective shortness of "objectively" long periods.
9. Experienced great length of short periods (spreading of events).
10. Dependency on how others experience time (the participant wants suggestion).
11. Frozen, fixed time as in depression or altered states.
12. Closedness of time; narrow, confining boundaries of time.
13. Fullness of the "eternal now" (which isn't time).
14. Reversibility of time flow ("future" to "past"), or irreversibility of the flow.
15. Time-structure analogues to experienced structure of space or sound (e.g., analogues to rapidity and rhythmicity of sound or space).
16. Time as enfolded or "surrounded" by eternity; an anticipated period of trial after one's death.

Experiencing space. The participant's ways of experiencing space are approached via assessing the following possibilities:
1. Space as being the same in all directions (isotropic).
2. Certain directions having specific feelings or properties, e.g., for sacred or numinous space (being an anisotropic situation); safeness or threat of particular spatial orientations, either preferred orientations or orientations to be avoided.
3. Emptiness without shape.
4. Fullness having shape, inherent bending, definable regions.
5. Personal space having definite volume, shape, territoriality.
6. Visual objects being in character diffuse, stark, or abrupt; such as sharply differentiated objects, or objects that diffusely merge with surrounding visual content.
7. Preference for certain kinds of visual boundaries between solids and empty (or less solid) space.
8. Preferred forms of visual rhythm in structure or color.
9. Roughness or smoothness of visual texture.
10. Having or not having a numinous sacred quality that surrounds, supports, and guides the person.
11. Unboundedness of experienced space.
12. Preferred color hues, saturation, visual texture, visual rhythm; visual gestalt patterns.

Experiencing centeredness. The participant's ways of experiencing centeredness are approached via assessing the following possibilities:
1. Experienced viscerally as feelings of warmth and support.
2. Experienced as a precipice, world edge, or bottomless gulf.
3. Experienced as a smooth foundation.
4. Experienced as a jagged, threatening field.
5. Experienced as a warm, supportive numinous field.
6. Experienced as an intense effulgence of light.

Experiencing sound. The participant's ways of experiencing sound are approached via assessing the following possibilities:
1. Sound texture.
2. Preferred melodic contours.
3. Timbre.
4. Dynamics.
5. Musical rhythm.
6. Aural gestalt patterns.
7. Boldness versus need for safety as evidenced by melodic contours with specific dynamics and rhythmic structures.

Experiencing feelings. The participant's ways of experiencing feelings are approached via assessing the following possibilities:
1. Characteristic patterns of emotions for the participant, and transitions between them; these are referred to as "emotive contours" for the present invention.
2. Dominant feelings and emotive contours at time of assessment.
3. Feelings the participant desires to experience or to work with.
4. Feelings the participant desires not to experience or to work with.
5. Interpretation of the participant's feelings, and transitions between them, based on traditional approaches such as the shakti systems of India, the kabbalah Existential Analyzer Multimedia Environment Manager (EAMEN)

The program EAMEM 74 is a service interface between the expert system EAES 72 and the multimedia primitive operations manager EXMPOM 96 in the EXM 22. All interactive multimedia operations by EAES 72 and the participant take place via calls to EAMEM 74 which then internally interfaces as necessary to the EXM 22 multimedia primitive operations manager EXMPOM 96. EAMEM 74 offers service requests dedicated to the needs of the EAES expert system 72, then translates these to service requests to EXMPOM 96. Requests are made to EXMPOM 96 via the EXMREQ request queues 60, which is also the vehicle for any subsequent responses from EXMPOM 96. The multimedia control regime realized by EAMEM 74, EXMPOM 96, and the UOS 24 creates and manages any needed graphical user interface operations for multimedia communication with the user.

Existential Analyzer Executive Communicator (EAEC)

The program EAEC 76 serves as a service interface between the expert system EAES 72 and the executive primitive operations manager EXEPOM 94 in the EXM 22. This refers to services such as tasks or activities management, data base operations, input/output, memory management including virtual memory structures, and remote operations involving transmission capacity. EAEC 76 is used to issue activation service requests to the FAM 16 or the ENM 20; service activation requests from other modules (and from the EAM 12 itself) are received via this program. Requests are made to EXEPOM 94 via the EXMREQ request queue 60, which is also the vehicle for any subsequent responses from EXEPOM 94, and for activation requests directed to EAM 12. All managed resources operations, such as related to tasks, processors, or transmission capacity, as above, take place via calls to this program EAEC 76.

The Facilitator Module
Facilitator Expert System (FAES)

Referring to FIG. 4, there is a facilitator module expert system (FAES) 78 for providing determination of at least one appropriate enactment. There is also a multimedia environment manager (EAMEM) 80 in communication with EXMPOM 96 for providing an FAM 12 portion of a multimedia interface between the user and the FAES 78. Additionally, there is a facilitator executive communicator (FAEC) 82 in communication with EXEPOM 94 for providing a control interface between the FAM 16 and the UOS 24. In addition, there is a facilitator module myth-oriented encoder FAEMOE 82 to build or encode a script for each enactment determined by the FAM 16.

The FAM 16 utilizes the assessment in the EXD data structure 14 to generate at least one enactment script for describing the form and content of at least one enactment, the enactment script being a portion of the END data structure 18.

FAES 78 is a rule-based expert system that accomplishes the functionality of the FAM. FAES 78 first establishes a multimedia environment with the participant, i.e., with appropriate windowing or non-windowing regimes, graphical user interfaces, and other modes of interaction. The FADIS digital image and sound file 48 is established for use across the interface. FAES 78 makes use of its associated rule base data structure FARULE 42 to perform all facilitation functions. FAES 78 applies techniques from life-path counseling, personal myth workshops, and analysis of results from the preceding MLP assessment from the EAM 12, to identify one or more depth systems, and one or more related enactments, for the present user. This is accomplished via interactive multimedia dialogue. The result is a series of descriptions of one or more enactments, each description representing one and only depth system; the depth systems represented by the chosen enactments can all be the same, or they can be several depth systems, or there can be as many depth systems as there are enactments in the series. Results of the preceding TOE assessment from the EAM 12 are integrated within the descriptions so that they will be in effect during the actual generation of the enactments with the present participant. The results of the present facilitation are written into one or more enactment descriptor END data structures 18 for the present participant. Each END data structure 18 describes an intended enactment in the form of a script within the END data structure 18 that stipulates agents, actions, unfolding relationships, and references to preceding TOE assessment results from the EXD data structure 14 for the present participant. This process of script-encoding can utilize generic END data structures 18 within library END-GEN 34 of such data structures. Thus generic scripts for enactments within depth systems are available in this fashion.

In addition, there can be special depth systems selected, dedicated to exploring aspects of reality such as themes within several depth systems, e.g., dream experience symbolism and its elaboration, exploring experiences of one's mortality in life, or particular kinds of agents (e.g., archangels, meditation masters) within a group of depth systems. Series of mythic enactments from depth systems also allow experience of other themes, for instance, ceremonial aspects observing processes of creation, mythic rites of passage for particular circumstances, spiritual life paths and stages, or the birthing process. A user may invent his or her own depth systems of numinous imagery and sound for subsequent exploration. Such invented depth systems must exemplify the criteria for depth systems stipulated in the qualitative model of world emergence.

FAES 78 also allows the participant to study depth systems via interactive multimedia presentations. This study mode is distinct from the mode of direct experiential involvement with mythic virtual realities that takes place during the enaction phase. Study is meant to be a means of identifying one or more depth systems to be explored subsequently in virtual reality via the ENM 20. By extension, this study mode allows exploration of the disciplines involved in the present invention itself, e.g., phenomenology and existential analysis, comparative mythology, neurolinguistic programming, or the expressive arts therapies.

The modules EAM 12, FAM 16, ENM 20, and EXM 22, and the UOS 24, all residing on the present platform 26, comprise a subsystem capable of communicating with other such subsystems at other platforms 26. FAES 78 incorporates intelligence means within the present subsystem for detecting and reporting new mythic patterns arising as aspects of mythic exploration by participants via interaction with the present subsystem. There is a networked communication means between these subsystems allowing the present subsystem to report to desired other subsystems information about detected new mythic patterns, and to receive such reports from the other subsystems.

For these purposes FAES 78 examines all EXD data structures 14 as they are generated, and interprets all ENA data structures 36 that have been constructed by the ENM 20, and interprets all EXD data structures that have been constructed by the EAM 12. In this way FAES 78 notes new generic patterns from MLP and TOE assessment by the EAM 12 as recorded in EXD existential descriptor data structures 14; new patterns of enactments and series of enactments chosen by the FAM 16 as recorded in END enactment descriptor data structures 18; and new patterns of enactment actualization during executions of the ENM 20 as recorded in ENA enactment actualizer data structures 36. These new patterns collectively comprise new mythic patterns. The communications means is implemented by remote communications abilities of the UOS 24; FAES 78 utilizes these abilities via service calls to the Executive Primitives Operations Manager EXEPOM 94 in the EXM 22. FAES 78 involves the participant in assessment via interactive multimedia operations accomplished by request calls to the multimedia environment manager FAMEM 80 which will in turn phrase and issue calls as necessary to the executive EXMPOM program 96 via the EXMREQ 60 mechanism. FAES 78 accomplishes internal executive services needed during assessment by calls to the executive communicator FAEC 84 which in turn phrases and issues calls as needed to the EXM 22 program EXEPOM 94 via the EXMREQ 60 mechanism. Generation of enactment scripts, to be subsequently interpreted by the ENM 20, is accomplished by function calls to the enactment myth-oriented encoder, FAEMOE 82, within the FAM 16.

FAES 78 includes a means of cessating control to accomplish open-loop evaluations, and of subsequently regaining control with the acceptance of related information. These operations are accomplished via calls to FAEC 84, which then in turn lodges requests to EXEPOM 94.

FAES 78 can embed execution instances of the EAM 12 to obtain incremental assessment during the course of facilitation. Similarly, instances of the ENM 20 may be embedded in order to create partial mythic virtual realities for trial during the facilitation process. FAES 78 can also embed instances of itself in order to allow concurrent or parallel aspects of facilitation to progress.

Facilitator Multimedia Environment Manager (FAMEM)

The program FAMEM 80 serves as a service interface between the expert system FAES 78 and the multimedia primitive operations manager EXMPOM 96 in the EXM 22. All interactive multimedia operations by FAES 78 and the participant take place via calls to FAMEM 80, which then internally interfaces to the EXM 22. FAMEM 80 offers a service request interface dedicated to the needs of the FAES expert system 78; it receives service requests across the interface, then translates these to service requests provided by EXMPOM 96. Requests are made to EXMPOM 96 via the EXMREQ request queues 60, which is also the vehicle for any subsequent responses from EXMPOM 96. The multimedia control regime realized by FAMEM 80, EXMPOM 96, and the UOS 24, create and manage any needed graphical user interface operations for multimedia communication with the user.

Facilitator Executive Communicator (FAEC)

The program FAEC 84 serves as a service interface between the expert system FAES 78 and the executive primitive operations manager EXEPOM 94 in the EXM 22. This refers to services such as task management, data base operations, memory management including virtual memory structures, and remote operations involving allocation of transmission capacity. FAEC 84 is used to issue service requests to activate the FAM 16 or the ENM 20. Service activation requests from other modules and from the FAM 16 itself, are received via this program. All operations for managed resources such as tasks, data bases, memory, processors, or transmission capacity, take place via calls to FAEC 84.

Facilitator Enactment Myth-Oriented Encoder (FAEMOE)

The program FAEMOE 82 serves as a service interface between the expert system FAES 78 and the mythic generation primitive operations manager EXMGPOM 100 in the EXM 22. FAES 78 calls FAEMOE 82 in specifying descriptions of each desired enactment for the present participant. The description is built in the form of a script that will subsequently be interpreted by the ENM 20 in generating a mythic virtual reality in real-time. Successive calls to FAEMOE 82 cause successive portions of the enactment to be encoded in a myth-oriented language syntax. Each enactment is representative of a specific depth system; the script for the enactment describes a progression of actions involving agents and the participant and their modes and textures of interaction. Ways of integrating the results of TOE assessment within the virtual reality are also delineated in the script (e.g., the incorporation of specific visual or sound textures). Use of FAEMOE 82 together with EXMGPOM 100 is intended to implement consistency of the enactment being built with the controlling depth system. FAEMOE 82 invokes the services of EXMGPOM 100 via requests placed in the EXMREQ request queues 60, which is also the vehicle for any subsequent responses from EXMGPOM 100.

The Enactor Module

Referring to FIG. 4, there is an enactor module expert system (ENES) 86 for providing utilization of information from an EXD data structure 14 and an END data structure 18 to generate at least one mythic virtual reality. There is also an enactor module virtual reality environment ENVREM 88 in communication with EXVRPOM 98 for providing a virtual reality interface. Additionally, there is an enactor module executive communicator ENEC 92 in communication with EXEPOM 94 for providing a control interface between ENM 20 and the UOS 22. In addition, there is an enactor module enactment myth-oriented decoder ENEMOD 90 in communication with EXMGPOM 100 to interpret a previously encoded script for each enactment.

Enactor Expert System (ENES)

Referring to FIG. 4, ENES 86 is a rule-based expert system that accomplishes the functionality of the ENM 20. ENES 86 first establishes a virtual reality environment with the user, i.e., determines what virtual reality capability exists on the present platform 26, ascertains what form and level of that capability are to be used, and adjusts control software parameters for this purpose. The ENM 20 initializes the virtual environment for the present participant; this is accomplished via calls to program ENEC 92, and then indirectly (by ENEC 92) to EXEPOM 94, to "establish a virtual reality environment" as described for the EXEPOM 94 in the EXM 22. As an aspect, ENEC 92 determines the forms of virtual reality that can be generated by the current environment, given the physical nature of resident virtual reality systems; and adjusts internal system parameters to reflect this knowledge for use during the dynamic virtual reality generation process. Thus the ENDIS digital image and sound file 50, shown in FIG. 3, is established. ENES 86 makes use of its associated rule base ENRULE data structure 44 to perform all ENM 20 functions. The ENM 20 then drives ENVREM 88 to generate real-time enactments in mythic virtual realities with which the present user participates. If a series of enactments has been specified by the FAM 16, then a mythic virtual reality is generated for each enactment in turn. Each enactment is carried to completion (unless otherwise purposely terminated) before a mythic virtual reality is generated for the next enactment of the series. The preceding TOE assessment results conveyed from the EAM 12 are integrated within the virtual realities in ways specified for the participant and the nature of the enactments involved; e.g., an enactment with significant visual process may stress assessed space parameters, or an enactment with significant sound processes may stress assessed sound parameters.

The ENM 20 generates at least one enactment actualizer ENA data structure 36, shown in FIG. 2, each being associated with a corresponding END data structure 18, each ENA data structure 36 describing significant aspects of the real-time enactment of the corresponding END data structure 18.

The ENM 20 creates an ENA data structure 36 to record specific happenings during the unfolding mythic virtual reality for each enactment. A separate ENA data structure 36 is created for each enactment; and a series of ENA data structures 36 is created for a series of enactments. An ENA data structure 36 records departures from the enactment scripted in its associated END data structure 18 and includes an accumulative history of the person's participation with the specific enactment for the present depth system.

The EAM 12 and the FAM 16 utilize information from the series of at least one ENA data structures 36 for generating the EXD data structure 14 and the series of at least one END data structure 18.

This situation can occur since either the EAM 12 or the FAM 16 can embed instances of mythic virtual realities to accomplish assessment or facilitation processes, respectively, for the present participant.

Referring to FIG. 4, ENES 86 involves the participant in enaction via virtual reality operations accomplished by calls to the virtual reality environment manager ENVREM 88, which in turn phrases and issues calls to the program EXVRPOM 96. ENES 86 steps through the enactment specified in an END data structure 18 (see FIG. 2) via successive service requests to ENEMOD 90. ENES 86 accomplishes internal executive services by calls to the executive communicator ENEC 92, which in turn phrases and issues calls to EXEPOM 96 via the EXMREQ 60 request queue mechanism (see FIG. 3). Decoding of enactment scripts is accomplished by function calls to the enactment myth-oriented decoder ENEMOD 90, in FIG. 4, which in turn issues calls as necessary to the program EXMGPOM 100.

The ENM 20 includes a means of cessating control for open-loop "leave and return" situations, and of regaining control upon the participants return with acceptance of information about the requested experience. There is also a means for recapitulation of enactments during the current session with the present invention, and referral to external sources for continued exploration (not necessarily with an anticipated return) of given depth systems.

During the enaction process it is possible to have directed experience external to the invention suggested during an enactment; this means it is suggested that the participant leave to have a specific form of mythic experience, and then return with his or her learnings and insights. Thus there is a process allowing the user to leave to have the suggested experience, and then to return, lodge the results, and continue with the overall enaction process. This is the "leave and return" process, helpful for exploration continuing over long periods. Combined with a sequence of enactments, this process allows gradual mythic exploration of one depth system or progressive exploration of a mixture of depth systems.

The expert system ENES 86 can embed execution instances of the EAM 12 under itself in order to obtain incremental assessment during the course of enaction; similarly, instances of the FAM 16 may be embedded under the current instance of ENES 86 in order to create partial, incremental suggestions of enactments for trial during the course of enaction. ENES 86 can also embed instances of itself in order to allow embedded mythic virtual realities within the current mythic virtual reality. This allows nested levels of experiencing depth systems.

Enactor Virtual Reality Environment Manager (ENVREM)

The program ENVREM 88 is a service interface between the expert system ENES 86 and the virtual reality primitive operations manager EXVRPOM 98 in the EXM 22. All virtual reality operations by ENES 86 and the participant take place via calls to ENVREM 88; the latter then internally interfaces to the EXM 20. The virtual reality control regime realized by ENVREM 88, the EXM 22, and the UOS 24 creates and manages any needed virtual reality user interface.

Enactor Enactment Myth-Oriented Decoder (ENEMOD)

The program ENEMOD 90 is a service interface between the expert system ENES 86 and the mythic generation primitive operations manager EXMGPOM 100 in the EXM 20. ENES 86 calls ENEMOD 90 in interpreting descriptions of desired enactments for the present participant. Each description is in the form of a script previously developed by the FAM 16. On-going interpretation of an END data structure 18 description takes place in real-time during its continuing generation in virtual reality by ENES 86. Each enactment is representative of a specific depth system; each script describes a progression of actions that constitute the enactment involving agents and the participant. Ways of integrating the results of TOE assessment from the EXM 16 are also stipulated in the script. Use of ENEMOD 90, together with the EXM 22 program EXMGPOM 100, guarantees complete consistency of aspects of the enactment with the controlling depth system.

Enactor Executive Communicator (ENEC)

The program ENEC 92 serves as a service interface between the expert system ENES 86 and the executive primitive operations manager EXEPOM 94. This refers to services such as tasks or activities management, data base operations, memory management including virtual memory structures, and remote operations with allocation of transmission capacity. ENEC 92 is used to issue activation service requests to the EXM 12 or the EAM 12 or the FAM 16; service activation requests for ENES 86 from other modules (and from ENES 86 itself) are received via this program.

Sample Scenarios of Use

The following are representative scenarios for the use of the present invention. In each case a hypothetical user approaches the present invention to explore personal life-patterns of mythic significance.
Particular depth systems are mentioned below for the sake of illustration, but many others could also be mentioned. Similarly, there are many ways of experiencing time, space, and centeredness, with individual preferences, and only a few are mentioned in the following scenarios. There is large potential for inventing enactments having mythic significance, and broad ways for participants to explore their mythic preferred futures.

Jungian Arcetypal Psychology

The user has, in this case, been a student of Jungian archetypal psychology and believes the collective unconscious guides the course of life through emergent, archetypal imagery in dreams and myth. The user takes the individuation process as fundamental for life and spiritual progress. Assessment first establishes a certain sense of closeness to these beliefs, and that the user is a highly visual person preferring soft, diffuse visual textures. Facilitation indicates an intermediate stage of individuation, and determines an appropriate psychological type involving the four functions of the Jungian typology. It is realized, based on dream analysis, that the user may be helped by visual immersion in a beautiful mandala. Dream analysis takes place—involving symbolism and agents—via a specially-crafted enactment based on the archetypal psychology depth system. The enactor module creates this virtual reality as delineated previously by the facilitator module. Due to complexity and subtlety of analysis, there is interpretation by an analyst, who is assisted by the invention's processes. As a result the user experiences a virtual reality with the mandala—a numinous agent—presented in the desired soft and diffuse way. The mandala can pulsate with cyclical rhythms the user finds natural, exhibiting both time rhythms and visual rhythms. The user is enabled to create the virtual mandala with appropriate levels and forms of detail, color, and size, and reflecting the user's dream symbolism as a step toward personal individuation.

Shamanism

The user has participated in shamanic ceremonies and finds the worldview and practices of shamanism to be quite satisfying. The assessment function determines this, and the user's inclination to solid study as well as proneness to depth of shamanic experience, and notes forms of visual texture, sound patterns, and time flow that are personally congenial. Facilitation determines that the user wants to explore shamanism more fully, desiring an overview of several traditions followed by experience of chosen enactments. In result, a series of enactments is set up, offering individual and comparative studies of shamanism in the southwestern United States, Alaska, Peru, Siberia, Africa, and including the Australian aboriginal Dreamtime. The user experiences these successive enactments in virtual reality making use of appropriate visual and aural experience, also exploring ritual and visionary aspects. Cyclic, repeating time experience is quite natural for the venue of shamanism. All of this is expressed by agents such as power animals, spirit guides, and virtual shamans. On a subsequent visit the user decides to explore ritual experience via enactments using visualization of intense, glowing quartz crystals (agents) and spirit helpers (agents also). The user is enraptured by this and requests referral to an outside source of continuing experience, which he is given. Subsequent sessions take place to study and experience ceremonial and ritual aspects guided by numinous agents.

Dissatisfied with Faith

The user has followed a particular but dissatisfying faith (unnamed here) for years, in which the user was raised. The faith requires rigid adherence to a party line and the user believes that another, more living path would be better for actual temperament and natural expressive instincts. The user has realized that an aspect of maturity is to understand ones mortality—the presence of potential death that is present continually. The previous tradition claims that all is love and beauty, that there is no darkness in life, and nothing negative should even be voiced or thought of, let alone performed. The user is not satisfied with this and wants to explore particular alternatives. The invention records the user's personal data, and the fact of being repelled by the faith raised in. The user decides to experience the attitude toward death and mortality in a number of traditions, exemplified by several depth systems. The facilitator module in result creates a series of enactments giving experience of how the dark side is understood in the various chosen system. The user experiences all of these in virtual realities, in succession; and perhaps is involved with a virtual teacher agent in each case and is led through appropriate virtual experiences expressed via preferred ways of experiencing visual and sound texture. The user finds (in this case) deep affinity with a particular depth system, explores it more fully, and decides to adopt it to continue the course of life and exploration.

New Personal Depth System

The user wants to create a new depth system—a body of knowledge, wisdom, visual and aural processes that speak in deepest ways. One available approach is eclectic, namely to select meaningful enactments from existing depth systems, which can then be made available as the user's "own" virtual reality. The user first indicates significant life patterns and texture of experience to the assessment phase. Facilitation then finds related archetypal life shapes and patterns in depth systems, suggesting potential enactments. The user can then explore these, gradually to select and cull those that are on target. Experimentation takes place with forms and levels of visualization, shapes and textures of sound, kinds of entities and numinous agents participated with, explanation of individual origin, nature, and destiny. Another approach is to be in a virtual reality with an amorphous, aware agent radiant with intense luminous light; the user then gives this agent textured shape and sound as desired in ways that are intuitively "right". The virtual reality offering this can have ways of helping to focus and structure visions. With an authentic approach this can elicit archetypal projection and can evolve into personal meditative enactments. The user is enabled to participate to experience "new myth" and to shape it in an ongoing fashion. A requirement for such experimentation to become a depth system, is that it adhere to the qualitative model of world-emergence.

Charismatic Christianity

The user adheres to charismatic Christianity and is quite comfortable in this belief system. He comes to the invention to deepen understanding of Old and New Testament scripture and to experience the lives, situations, and beliefs of early patriarchs and church fathers. Once the invention understands these goals, the shape of the user's life experience is used to suggest particular Biblical figures that could serve as models, and from whom learning could take place in subsequent enactments. Enactments are then determined, to explain and interpret Biblical text, to experience dramatizations of major historical events, and to role-play to learn ways of healing by laying on of hands and praying to the Holy Ghost. The user can be referred via the "leave and return" process to external experience and learning, then return for more enactments. Enactments can also teach about Bible prophecy, and, if desired, can help trace similarities in other depth systems, some of which precede Christianity by very long periods. Scenarios include visualizing and hearing virtual reality choirs of angels, with which the user can participate; the creation of the world and other incredible events.

Monastic Christianity

The user is recognized as in a life-crisis, was raised in a Catholic cultural background, and has strong preference for rich visual experience. The facilitator module realizes the person's closeness to Roman Catholicism (which he affirms), and notes the situation's similarity to the life of a particular saint in the early church. The user then decides to role-play in virtual reality as guided by the saint's experience, and by the latter's virtual presence as agent; in result becoming involved in virtual ritual of strongly visual nature that helps through the crisis. The virtual environment uses the historical time frame of the Church—and shapes visual texture and quality to the user's needs. The user could also experience Gregorian chant (which is a numinous agent in the form of sound textures) and engage in practices based on medieval systems of contemplation. By exploring the user comes to identify with the saint, not because the latter is "perfect" but due to being a great contemplative. The user then changes life perspectives to incorporate rich, living ritual and contemplation introduced to and experienced in virtual reality. The user can then be referred to a place or person for living, extended experience and succorance offering transition to life past the crisis.

The Kabbalah

The user was raised in reform Judaism, felt to be very satisfying as a guide through life, giving comfort with its ceremonies, observances, and teachings. However, the user has for years wanted to explore the Kabbalah, the marvelous teaching of inner worlds and exploration, as shaped by the Bal Shem Tov in Poland in the 1500's, and as formulated by the Rabbi Isaac Luria. The invention is used for this purpose. After the assessment function determines preferred ways of experiencing, and shapes of life, the facilitation arranges a series of enactments which are pursued on successive visits. First, the user is given an overview of the Kabbalah; then facets are experienced that appeal most. The user learns of the Etz Chaim—the Tree of Life—visualized with its beautiful, glowing mystic spheres connected by paths of meditation. A more complex assessment suggests where the user most naturally participates on the meditative path—and a Kabbalistic virtual reality is generated in which the Tree has been rotated to place near him the sphere that most gravitated to. The user chooses to see orders of angels, hear choruses, and connect to the limitless depth of the kabbalah—guided in contemplation, shown visualizations, helped to concentrate on appropriate aspects.

East Indian Spirituality

The user wishes to investigate and experience East Indian spirituality. In the general Indian religious tradition there are four recognized stages of life: childhood, student, adult householder, and aged person. Additionally there are major approaches to spiritual experience depending on the personality of the aspirant. These include karma yoga (work or service), jnana yoga (knowledge), raja yoga (psychological), and mantra yoga (repeating sacred words of power). The assessment phase for this user identifies the personal factors usable to suggest the life stage and personality structure, plus the fact of being interested or experienced in Indian religion. The facilitation then designs one or more enactments of particular types. There are many possibilities depending on stage of life and personality structure—which can of course be blended and combined with other situations. Some possibilities: participating with a Vedic sage who teaches and guides; involvement with a numinous diagram along with chant; being guided through breathing exercises (pranayam) via diagrams with moving points of light; participating with visionary realms of gods and goddesses; participating with creation of worlds and universes; ceremonies that are powerful and beautiful. The user can be involved with these and more in ways that help him in finding intense and abiding meanings in his life.

Research Scientist

The user is a scientist searching for purpose in life, which does not seem to be offered by science. However, the user is aware that eminent scientists have expressed deepest meaning within a worldview combining science with spiritual purpose and its unfolding within the physical realm. As a result, the person visits the present invention in a search for purpose and meaning. In result, the present invention involves the user in a series of enactments suggesting helpful understandings via instructive and ennobling involvements. These enactments offer the user experiences suggesting that science operates like a mythology when it shapes one's worldview; that science is not fundamentally opposed to spiritual interpretations of reality and cosmos; and that meditation can be based on methodology and repeatability of spiritual experience. In addition, evolving theories of the nature of consciousness are offered—via experiences based on them—and shown to be of deep personal significance. He or she is also shown that metabiology based on medical genetics can provide a basis for "rapture" as approached in many spiritual traditions. Thus the user becomes open to an extended lifepath combining scientific understanding with mythic currents in personal and cosmic origin, nature, and destiny. Further ways of fostering these experiences are offered to the user.

Experimental Depth Systems

It is possible to offer users an array of depth systems especially crafted for experimental, visionary, exploratory worlds. The primary requirement is that they must observe and reflect the qualitative model of world-emergence referred to earlier. One form of experimental depth system corresponds to mythic aspects of life as understood in one or more other depth systems, but elaborated and focussed. Two examples already mentioned are human mortality; and dream analysis—Jungian, Freudian, or holotropic. Another form of experimental depth system relates to primeval awareness and experience of the human race extending back to the proto-human, capturing the immense scope and sweep thereof; or involvement with visionary spiritual realms spoken of by various traditions. Another form of depth system creates worlds based on current theories of consciousness, such as quantum physics processes; or viewing present modes of consciousness as influenced by future stages of the human race and the kinds of world-awareness that would ensue; or worlds exploring the domains of machine intelligence interplaying with human needs. Existential theories of the spatialization of time, and other modal interchanges, can be experienced and explored. Depth systems can be developed for integrated mythic performance art using agents to explore extended mythic realms.

STATEMENT OF PREFERRED
REQUIREMENTS FOR THE PRESENT
INVENTION

This section elaborates the preceding detailed description of the present invention by providing an explicit statement of system-level and module-level requirements. Additionally, requirements for open systems architecture are stated.

System-Wide Preferred Requirements

The following presents system-wide requirements in the categories of functions, data bases, module identities, qualitative model foundations.

System-Wide Functions
1. The present invention offers involvement with systems of meditational and mythic exploration referred to as depth systems.
2. The present invention performs assessment of the user's experiential world both for mythic life patterns and texture of experience.
3. The present invention performs facilitation to choose a series of enactments for the user, each enactment drawn from one depth system.
4. The user must feel the presence of events and processes within enactments, to be able to interact with them on a deep level, to have a sense of immersion within the world of an enactment. The present invention uses virtual reality to accomplish this.
5. The present invention generates mythic virtual realities that incorporate chosen enactments.
6. The present invention allows the user to explore enactments in virtual realities during one or multiple sessions.
7. The present invention provides ability to study any depth system and every discipline (e.g., existential analysis, comparative mythology) used in the present invention.
8. The present invention includes executive control services that adapt the entire system to operation on architectures consisting of one platform or intercommunicating networks of platforms.
9. The present invention expresses rhythm within the participant's experiential world; these include visual rhythm, aural (or musical) rhythm, rhythms of emotive states, and biorhythms.

System-Wide Data Bases
1. A system-wide
   1. A system-wide dynamic data base is maintained; it includes interactive multimedia control and data interfaces.
2. There are specific data bases for the EAM.
3. There are specific data bases for the FAM.
4. There are specific data bases for the ENM.
5. There are specific data bases for the EXM.
6. There are specific data bases for multimedia interfaces.
7. There are specific data bases for virtual reality interfaces.
8. There are specific data bases for network-based interfaces.

System-Wide Module Identities
1. The assessment function is implemented by the EAM. The EAM incorporates an expert system with interactive multimedia interfaces.
2. The facilitation function is implemented by the FAM. The FAM incorporates an expert system, a myth-oriented language encoding program, with interactive multimedia interfaces.
3. The enaction function is implemented by the ENM. The EAM incorporates an expert system, a myth-oriented language decoding program, with virtual reality logical (versus physical) interfaces.
4. The executive function is implemented by the EXM, including managers for executive primitive operations, multimedia primitive operations, virtual-reality primitive operations, and mythic-generation primitive operations.
5. The EXM is built over the UOS and makes use of its services.
6. The UOS provides adequate kinds and degrees of resources management services including those for remote communications and operations.

System-Wide Qualitative Model Foundations
1. The model assumes a subject who experiences inner and outer emergent phenomena, "presented" with purpose as part of the subject's life, continually shaping the subject's world.

2. The model assumes a source of individual worlds (worlds of individual persons)
3. The model assumes a ground of being underlying all experience, and assumes ability to assess the experience of ground approached as "centeredness".
4. The model assumes processes of emergence that crate structure, process, and conventions underlying each individual world, processes described by metaphor incorporated in depth systems.
5. The model views cognitive structure of the subject's world as an adaptive organization as for cognitive psychology.
6. The model applies existential analysis, based on phenomenology, to work with the phenomena the subject experiences.
7. The model applies comparative mythology to life patterns within the participant's world of experience.
8. The model applies neuro-linguistic programming to determine factors such as primary modes of communication, e.g., visual, sound, or kinesthetic modes.
9. The model uses depth systems considered as bodies of visual patterns and sound structures developed for participating with emergent processes within the unconscious realm.
10. The model uses a meta structure applicable to all enactments, involving a range of numinous agents and modes of participating with them.

Individual Module Requirements

EAM Functional Requirements
1. The EAM performs assessment using methods of existential analysis, comparative mythology, the expressive arts therapies, and neuro-linguistic programming.
2. Assessment has two categories: mythic life patterning (MLP) and texture of experience (TOE); MLP focuses on archetypal patterns, TOE focuses existential variables.
3. MLP assessment and TOE assessment are performed independently of one another by the EAM.
4. The results of MLP assessment and TOE assessment are conveyed to the FAM and the ENM via a description the EAM generates.
5. Closed-loop interpretation of user responses is used, by which the EAM can fully interpret the responses; i.e., their complexity or subtlety can be interpreted by the EAM.
6. Open-loop interpretation of user responses is used as needed, for which responses, due to complexity, must first be interpreted by an analyst prior to being conveyed to the EAM.
7. The EAM performs assessment that is minimal for assessment purposes; assessment involving excessive complexity or duration are performed via special enactments by the ENM, not by assessment per se.

FAM Functional Requirements
1. The FAM performs facilitation by using techniques of life-path counseling involving archetypal mythic patterns in the person's life; nondirective client-centered approach is used.
2. Facilitation determines one or more depth systems suitable for the user, reflecting the preceding MLP assessment by the EAM.
3. Facilitation determines one or more forms of exploration (enactments) for each selected depth system, resulting in a series of one or more enactments to be generated by the ENM for the present user.
4. The FAM can decide to use a "special" depth system that works with a major theme or kind of experience available in different ways in several depth system. This will cause the ENM to generate appropriate enactments for the several depth systems suggested, or to collect needed enactments under the special depth system.
5. The FAM generates an internal description of desired enactments encoded in a myth-oriented language syntax; this is conveyed to the ENM and the EAM.
6. Closed-loop interpretation of user responses is incorporated, whereby the FAM can itself fully interpret the responses; i.e., their complexity is within FAM interpretive power.
7. Open-loop interpretation of user responses is incorporated as needed, whereby the responses, due to their complexity or subtlety, must first be interpreted by an analyst prior to being conveyed to the FAM.

ENM Functional Requirements
1. Mythic virtual reality generation is performed by the ENM in ways that offer a range of degrees of participant immersion.
2. The ENM generates mythic virtual realities for enactments as indicated in the description conveyed from the FAM.
3. The ENM engages the user in each enactment in turn, establishing a mythic virtual reality environment for each.
4. The ENM determines the form of virtual reality immersion available to the present configuration of the present invention, and adapts the needs of enactments to it, including how TOE assessment may best be utilized.
5. The TOE analysis for the current user, conveyed from the EAM, is used to express each enactment in appropriate ways.
6. The ENM includes a recapitulation phase as needed for the participant to review his or her experiences during the enactments that have just been experienced.
7. The ENM has a "leave and return" ability whereby the user can be referred to an external source or venue of experience; and to then return for further participation with enactments.
8. The ENM generates a description of the actual course of an enactment, that is conveyed to the EAM and the FAM.

EXM Functional Requirements
1. The EXM provides scheduling and resources management services to allow the EAM, the FAM, and the ENM to be executed and to communicate in the real-time control environment.
2. The EXM offers standardized request and response service interfaces to the three other software modules.
3. Services are offered for multimedia primitive operations, virtual-reality primitive operations, mythic-generation primitive operations, and executive primitive operations.
4. The EXM translates service requests from the other modules to services available from the UOS; and translates responses from the UOS to responses to the requesting modules.
5. The EXM performs all requested services from other modules through its own processing in conjunction with issuing subsidiary service requests as needed to the UOS; similarly, it routes UOS responses to the requesting modules.
6. The EXM establishes an operating environment as part of initializing each instance of the EAM, FAM, or ENM. An interactive multimedia environment is established for an EAM or FAM instance; a virtual reality environment is established for an ENM instance.
7. The EXM can embed operating environments: a virtual reality environment within a multimedia environment, or a multimedia environment within a virtual reality environment, depending on the requirements of initiating nested module instantiations.

8. Any need for remote operations or communications is conveyed to the underlying operating system.

UOS Functional Requirements

1. Functions are performed by UOS event-driven services involving interactive multimedia/graphical user interface management, virtual reality management, data base management, configuration management, complemented by EXM services.
2. The UOS must provide adequate capability for remote operations if the present invention resides on a distributed network.
3. The UOS must provide adequate service interfaces for its use by the EXM.

Open Systems Architecture Requirements

1. Software modules should conform to appropriate open standards such as the ISO Open Systems Interconnection architecture model, for both the development and dynamic environments.
2. Software modules must use open interfaces such as the ISO Open Systems Interconnection architecture model, or Open Systems Foundation standards, for remote, distributed, network communications, file transfer, and remote user interfaces, including client/server processes.
3. The EAM, the FAM, and the ENM should be designed with capability for use as network servers capable of operating within either an open network or on single-platform organizations of resources.
4. Define the EAM, the FAM, the ENM, and the EXM to consist of a functional nucleus plus layered, incremental functions to implement appropriate architecture for the present invention.
5. Define service interfaces and functions between the EXM and the UOS, allowing EXM residency on platforms with different system services, in ways that conform to open architecture standards.
6. Define functional mappings from EXM services onto UOS services, mappings that are naturally based on open systems parallels and considerations.
7. Observe cross-platform open systems standards to implement the present invention on a variety of platforms; allow development of software modules on multiple platforms, e.g., through using the Chicago, Windows NT, or Unix operating environments.
8. Allow compatibility of operations with distributed Internet services, and with capabilities such as the Virtual Reality Markup Language (VRML) available from the World Wide Web (WWW).

Qualitative Model of World Emergence

The present invention is based on, and applies, a qualitative psychological model of the human psyche involving both conscious and subconscious levels, and recognizing main categories of experienced phenomena. The model establishes an integrating framework for the various disciplines and methodologies involved—including phenomenology, existential analysis, comparative mythology, the expressive arts therapies, concepts of continual emergence of each individual's world, and the many depth systems identified for the present invention. The model of necessity involves a high order of abstraction in order to realize the complementarity that exists among these disciplines.

Figure 7:
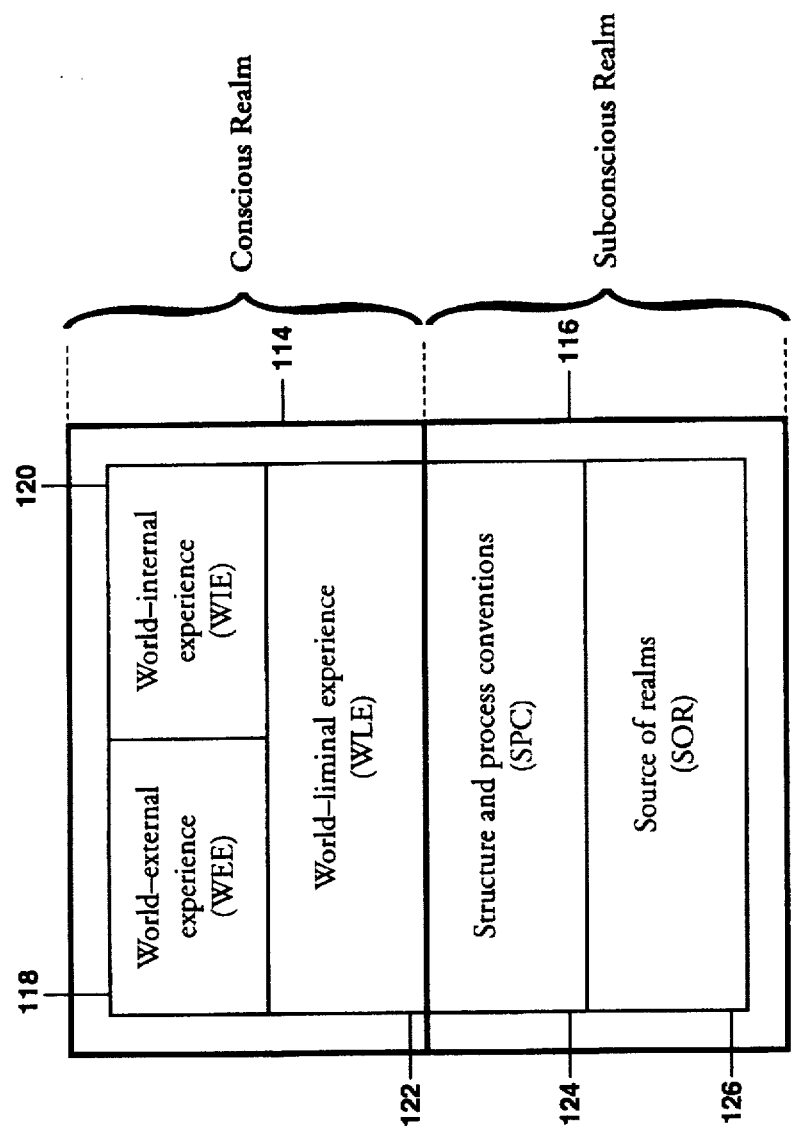
FIG. 7 is a schematic, top level, of the qualitative model of world-emergence developed for the present invention.

Referring now to FIG. 7, the model involves the Conscious Realm 114, the Subconscious Realm 116, and regions of experience called World-External Experience (WEE) 118, World-Internal Experience (WIE) 120, and World-Liminal Experience (WLE) 122. These terms are chosen to be neutral and therefore capable of being shaped by particular systems, e.g., world-liminal experience might more usually be called prelogical or preconscious, or as being at the preconscious level. Limiting connotations of the latter terms are somewhat avoided by the present terminology. Referring again to FIG. 7, the fundamental givenness and thrownness of one's world is shaped by Structure and Process Conventions (SPC) 124 that emerge from a numinous Source of Realms (SOR) 126 of all individual, personal worlds.

In the model, one's world is created continually through emergence that is taken to be purposive, to reflect personal destiny based on numinous processes. The structural ontological categories of space, time, etc., and experiential qualities, are understood to determine (and to "be") the world one experiences. The model understands depth systems to exemplify, and to give ways to work with, subconscious Structure and Process Conventions SPC 124 that continually create the participant's world, i.e., the universe of phenomena with which the subject is engaged within the overall manifold of time and space.

The model represents a structured, top down paradigm to progress systematically from concepts to detailed implementation. The model refers to (a) the structure of the participant's conscious experience; (b) subconscious processes of world creation in their role as continually formative of conscious experience via existential variables such as space, time, and centeredness; and (c) systems of symbolism that allow the participant to explore the process of world creation. Furthermore, the model is reflected in the present invention's architecture (a) through suggesting need for the EAM 12 and the application of existential analysis, comparative mythology, the expressive arts therapies, and cognitive psychology; (b) in stressing the central importance of depth systems and enactments chosen by the FAM 16, thereby determining the necessity of having the FAM 16; and (c) in establishing the importance and efficacy of enactments, thus suggesting need for the ENM 20. Thus these three modules are suggested by the qualitative model whereas the EXM 22 is suggested by software systems necessity.

The model applies existential analysis to understand phenomena of which the participant is consciously aware, i.e., the phenomena that comprise the person's Conscious Realm 114. Existential analysis is derived from the philosophical discipline of phenomenology; it is an approach to determining mythic patterns in the participant's life history, and to understanding how he or she experiences existential variables. The model views each person's world of phenomena as being emergent from a numinous ground infusing the Source of Realms SOR 126 and the Structure and Process Conventions SPC 124 of the individual world.

Emergence refers to a continual coming into being of the phenomena (both external and internal) that comprise the subject's unfolding experience. Emergence is a spatial metaphor suggesting an arising from the Subconscious Realm 82. Numinous refers to having a sense of the presence of divinity, however conceived according to particular cultures and systems. The model views all reality (ultimately as realized within the personal experiential worlds of individuals) as arising via emergence, so that the numinous is involved with emergence. The Subconscious Realm 82 is taken to embody the numinous and to express numinous symbolism within the participant's world. Myth is viewed by the model as involving sacred imagery and sound akin to that within hierophanies as suggested by Mircea Eliade.

Depth Systems

Depth systems—from which enactments are selected—are traditional or modern bodies of knowledge and experience that offer procedures for exploring and participating with inner processes of meditation and mythic encounter. Depth systems may exemplify traditional world mythology, e.g., Greek, African, Nordic, East Indian, Amerindian. Depth systems can also be ancient or modern systems of symbolism for mediational involvement, e.g., the use of mandalas or chant in the East Indian tradition, the use of power symbols in the tradition of shamanism as expressed throughout the world, or the use of mystic symbolism in Tibetan Buddhism, the Kabbalah, or medieval Christian monasticism. In either category of depth systems the participant is involved with visual or sound aspects, or both of these—visual symbols, musical chant or sound structures, or mythic personifications. In a broad sense each depth system is a finely-honed organization of symbols, beliefs, and practices for mediational or mythic exploration. Thus an enactment may be defined as a procedure involving image and sound symbols and methods for their use belonging to and exemplifying a specific depth system chosen by and for the individual participant.

A depth system allows the participant to experience continual emergence of his or her world, to describe via metaphor "what it is that's going on" in the Subconscious Realm 116 that creates one's personal world of experience. A depth system is taken to have an associated system of symbolism—visual, aural/musical, or both—allowing participation with the depth of experience with which the system is concerned, i.e., participation with the Source of Realms SOR 126, the Structure and Process Conventions SPC 124, and World-Liminal Experience WEE 118. A depth system may be considered a statement as to how the world comes about or arises into individual awareness.

Examples of depth systems are the East Indian shakti system involving visual mantrams, sound mantrams, and the chakra systems; the metaphoric Dreamtime worldview of some forms of shamanism; the Kabbalah as an ancient system of transformative symbolism; or the archetypal psychology of Carl Jung involving individuation processes and archetypal symbols of the collective unconscious. Examples of another type of depth system involve mythic personifications as in Greek mythology, the medieval Grail quest, or Native American creation myths or rites of passage. Representative depth systems, and examples of enactments, are shown above in Table 1. Additional depth systems and associated enactments are listed below foreseen as the present invention becomes elaborated in applications.

Depth systems such as the shakti system work with symbols and methods that represent structural aspects of personal-world creation, e.g., interrelationships between chakras or uses of kundalini energy, which may be interpreted as describing processes of emergence (personal-world creation) within the Subconscious Realm 116. On the other hand, depth systems of the "pure mythology" type, e.g., stories and transformations of Greek mythology, involve processes of psychological change and growth and rites of passage, as exemplified by personalities and situations of mythic involvement that suggest archetypal life-paths. The two types are strongly interrelated; for instance, systems of meditation and inner search often involve ritual procedures, numinous entities, and archetypal patterns of life; and systems of world mythology provide ways of participating with one's World, and provide personified, archetypal life patterns reflecting emergence within the Subconscious Realm 116. Procedures of inner search are often framed in terms of mythic symbolism and numinous beings.

Depth systems are in a deep sense interchangeable; they are culture-specific worldwide formulations of ways to express and explore inner processes that create and infuse one's world of experience. Depth systems are understood for the qualitative model to involve the Elementargedanke (elementary ideas) and Volkergedanke (ethnic ideas)—the former as expressed via the latter—of Adolph Bastian, as further developed by Joseph Campbell.

Thus depth systems, from a systems point of view, may in one sense be viewed as replaceable black box functions that represent processes and mechanisms for emergence. This does not mean depth systems are not necessarily strongly unique unto themselves, but it does mean they may all be viewed as functional systems to interact with depth processes of the psyche. The following is a fuller list of depth systems, each embodying a wide range of enactments:

expressions of shamanism (e.g., North and South American, Siberian, African, Hawaiian Huna, Aboriginal Dreamtime)

East Indian shakti and yogic systems, Hindu and Jain

Vedic, upanishadic lore with personifications; Vedanta

Medieval Christian systems of contemplative symbolism

Protestant Christian systems of numinous symbolism the Kabbalah in authentic, ancient formulation Tibetan and other Buddhist meditation systems; Zen Sikh, Sufi, and Islamic systems the Taoist system, including the I Ching the Celtic systems, including use of runes the Goddess religion in authentic formulation Shinto and other nature religions Greek, African, Nordic, Central American, other mythologies with life patterns Jungian archetypal psychology with life patterns archetypal psychology of James Hillman the Tarot as projective symbolism of psychic structure numinous imagery and sound shaped by the participant depth systems for research in emergent consciousness, e.g., quantum physics analogies, metabiology Phenomenology and Existential Analysis The branch of philosophy called phenomenology takes a person to be a subject who experiences and participates with phenomena, both external and internal. The ground of being, in which both internal and external phenomena inhere, gives both "forms" of experience an equal footing. Phenomena are embedded in (emergent from) ground. The present invention approaches one's experience of ground as "centeredness". Experiential qualities and their variations were discussed above for TOE assessment by the EAM 12.

A phenomenon, external or internal, is embedded within the subject's Conscious Realm 114. Internal phenomena have typical characteristics, and external phenomena have their own distinctive attributes, but there is no natural wall or cleavage between internal and external phenomena. Both types involve phenomena that are presented to the experiencing subject by the process of emergence as conditioned by emergent Structure and Process Conventions 124. The tangibility of external events does not suggest that such events are fully "out there" any more than are the less-tangible internal events "in here." Both are "here" within the person's external field, but experienced differently. Outward events are emergent as much as their inward brethren.

Emergence refers to a rising of ground into phenomena for the participant. Intuitively, the idea is that there is a sort of seamless integration of phenomena with the underlying ground. The phenomena are embedded or immersed in ground but arise into consciousness as identifiable entities.

The phenomena never emerge completely but always have hidden roots. One's world of phenomena, including conventions both structural and of a process nature, may be viewed as emerging from a Source of Realms SOR 126, creating an awareness of having identity as an individual surrounded by a complex world of phenomena. Phenomenology is concerned with ways that categories of phenomena can be known and investigated. Different fields of phenomena are apprehended in qualitatively different ways and investigated by different means. For instance, participation with numinous images might involve feelings of awe or fulfillment, but would be foreign to analysis incorporating the precision of mathematics, e.g., they are incapable of being analyzed completely rationally; whereas an engineered object such as a radar antenna would be approached with "technical exactness" inappropriate to something numinous or to an art object.

The two elaborations of phenomenology with which the present invention is concerned are those formulated by Martin Heidegger and James Hillman. Heidegger's phenomenology is based on the concept of human-being-in-the-world, or Dasein (the-there-being),which is understood as a continual process of revealing of being, i.e., of a continual disclosing referring to that unknown becoming known. In this view, phenomena are revelations to the experiencing subject that express an unfolding one must understand authentically. Heidegger emphasizes the fundamental importance of mythic and poetic roots of thought and meaning, and the predominant importance of how time is experienced. A different perspective is the archetypal psychology of James Hillman which is based on the givenness of irreducible images, expressing what is called the mundus imaginalis or "imaginal world." The latter is a numinous realm of creative imagination intermediary to the objective and the subjective, a realm populated by magical presences and beings. These images are akin to symbols defined below. Hillman's approach stress the importance of creative imagination Existential analysis is a methodology to understand a person's experiential world based on phenomenology. The therapist approaches knowledge of how existential variables are experienced. Existential analysis identifies many individual variations in how these variables are experienced. Existential analysis for the present invention emphasizes the participant's experience of time, space, music-sound, centeredness, significant rhythms in the participant's world, the participant's emotions, and centeredness as relatedness to ground. Experienced variables always involve subjective participation and are never intended to be merely conceptual constructs. Space, for example, is not just the geometry involved but also the feeling-toned existential involvement of the participant with spatial manifolds within experience. Experienced space can be anisotropic, i.e., have different qualities in different directions. An example is sacred space as understood by symbolic anthropology, centered around experiencing numinous objects in "sacred space," i.e., spatial manifolds that have emergent, numinous quality The Conscious and Subconscious Realms The Subconscious Realm 116 is different from a state of blankness or nothingness because active world-forming processes are taken to be involved. The term realm conveys a context in which happenings may occur and reveal themselves. In the model, the phenomena—inner or outer—that comprise ones's experience are seen as emerging "upward" into one's consciousness, i.e., into the Conscious Realm 114 from the Subconscious Realm 116. Subconscious mots are expressed and experienced as phenomena of individual subjective experience.

In FIG. 7 the Conscious Realm 114 is the totality of phenomena of which the participant is aware. The Conscious Realm 114 has the three regions of experience World-External Experience WEE 118, World-Internal Experience WIE 120, and World-Liminal Experience 122. World-External Experience 118 refers to phenomena in the outer world, e.g., constituted in consciousness with the attributes of "external." World-Internal Experience 120 refers to inner phenomena, e.g., feelings, thoughts, and imagery, constituted in consciousness with the attributes "internal." The region of World-Liminal Experience 122 is a zone of emergence through which subconscious antecedents become one's World. World-Liminal Experience 122 refers to experience the participant has of nascent, fleeting, barely perceptible inward visual imagery and sound having a connectedness with ground. World-Liminal Experience 122 is a precursor to World-External Experience 118 and to World-Internal Experience 120. It is capable of being interacted with and modified by emergent imagery and sound embodied in depth systems.

Each depth system is viewed as codifying ways to experience, explore, and analyze the nature of the mystery of the givenness of one's world. The Subconscious Realm 116 is viewed as a place in which processes of emergence occur that differentiate into the detailed manifold of one's conscious experience. Depth systems offer symbolism that allows one to participate with this process of emergence, i.e., one uses numinous symbolism to explore one's deepest depths and inclinations. The level of Structure and Process Conventions SPC 124 comprises the conditions of one's experiential World, e.g., that space has certain geometric properties such as being three-dimensional with certain topological characteristics; that one is a being "separate" from other phenomena and entities, immersed in a surrounding world; that time has a certain structure experienced in particular ways; that sound has certain emergent structure; that one is prone to certain emotive patterns. Still referring to Structure and Process Conventions SPC 124, a range of alternative structural and process conventions emerging within the Subconscious Realm 116, would, according to the model, result in the person experiencing embeddedness in different experiential worlds. Such conventions are part of the upward emergence into the Conscious Realm 114, creating apparent certainty of a surrounding with specific characteristics, in which one is conscious of a sentient island of awareness.

The boundary between the Conscious Realm 114 and the Subconscious Realm 116 is not fixed and may be thought of as dynamically adaptive; it is the joint presence of emergence into a personal world and the coalescing roots of such a world. There is a "moving boundary" separating the two realms because the participant, in working with a depth system, can become aware of what were formerly subconscious processes of which he or she was unaware. This is equivalent to "enlarging" the Conscious Realm 114 to involve what was previously within the Subconscious Realm 116. The boundary is also focused by the emergence of symbols. The term symbol for the present invention reflects the notion of an emergent message or significant expression of meaningful subconscious content. This is different from the technical definition of symbol, e.g., as for symbol manipulation processes. The notion of symbol for depth systems must be defined in a psychological-mythic way that undergirds and goes deeper than the technical definition; a symbol is defined in a depth psychology sense. For this, the definition given by Samuel Taylor Coleridge applies in a humanistic psychological sense, namely, that a symbol must have three characteristics: it must exist in itself; it must derive from something greater than itself; and it must represent in itself that greatness from which it derives.

To say a symbol exists in itself means it is feeling toned with numinous content and cannot be analyzed into parts and still convey its experiential meaning. This parallels concepts from existential phenomenology and Jungian psychology. A depth-system symbol is integral, indivisible, and never fully revealed, in similarity to Jung's symbols of the collective unconscious.

The Source of Realms 116 is viewed as a numinous precursor to all personal Worlds and their realms.

Structure of Enactments

The invention applies an overall structure as a means of shaping every enactment. An enactment's unfolding takes place in a mythic virtual reality in which the user participates. The user is understood during an enactment to be participating with a mythic presence termed an agent, or several such agents. An agent is a conscious, aware force, perhaps focussed on the user, with which the user is engaged during the course of the enactment. There are different levels and kinds of agents present in specific enactments. Representative agents are:

1. gods or goddesses in many traditions
2. angels or archangels in major traditions
3. spirit beings or spirit guides
4. power animals in shamanism
5. power objects in shamanism and other traditions
6. sound structures embodying intelligence and power
7. aliens
8. human beings such as adepts or spiritual leaders
9. disembodied presences or fields of directed awareness Every enactment unfolds via the user's participation with the agent or agents. There are several modes of participation of the user with the agent(s) outlined as follows:

1. The enactment makes use of preferred or desired visual textures and shapes—and similarly aural textures and shapes—known through the assessment process.
2. The enactment expresses shape and progression of time as determined via assessment.
3. The enactment expresses forms of "centeredness" determined by assessment; this can result in background visual or sound processes expressing the experienced (or desired) shape of the user's ground of being.
4. The enactment incorporates the user's awareness of self-boundaries; of the tangibility or diffuseness of boundaries with agents and other beings and objects.
5. The enactment unfolds according to an enactment script previously prepared by the facilitator module FAM 16.
6. The enactment may refer the user to an external experience allowing the user to leave and later return to continue the enactment (or next enactment in a series).
7. The user is offered means within the enactment to control the shape of time, visual textural aspects, mode of centeredness, and sound texture and shapes.
8. Interpersonal participation modes according to existential psychology are used within enactments.
9. The user may experience agents and other aspects in the virtual reality, with which he interacts, but not see himself within the enactment, or:
10. The user may take the role of—or "become"—the appropriate agent, or:
11. The user sees a virtual image of himself—one he controls—participating with other aspects of the enactment, so that the enactment is an immersive tableau in which the user's image allows his participation "one step removed."

Use of the Model

The assessment function performed by the EAM 12 seeks to understand salient aspects of World-External Experience WEE 118, World-Internal Experience WIE 120, World-Liminal Experience WLE 122, and Structure and Process Conventions SPC 124. These comprise, for purposes of assessment, the participant's world of experience. MLP assessment works with events and patterns in both WEE 118 and WIE 120, and attempts to infer underlying life-pattern precursors within SPC 124. TOE assessment works with texture of experience within WEE 118 and WIE 120, working with WLE 122 as a way toward understanding roots of the participant's ingrained and preferred textures of experience. Micro-imagery and micro-sound are used to focus on and clarify roots of WEE 118, WIE 120, and WLE 122 experience and structure, and to approach knowledge of the shape of SPC 124 for the individual participant.

The facilitation function performed by the FAM 16 interprets assessed mythic life-patterns within WEE 118 and WIE 120, and their precursors in SPC 124, and interprets the givenness of patterns within WLE 122. This interpretation process suggests closeness and appropriateness of specific depth systems and their enactments; also used is knowledge of what specific depth systems suggest about the actual and desired nature of SPC 124. From this, specific depth systems and enactments are suggested. Results of the TOE assessment—reflecting preferences for WEE 118, WIE 120, WLE 122, and SPC 124—are also recorded for integration within the ensuing enactment(s).

The enaction function performed by the ENM 20 places the user into mythic participation with one or more successive depth systems, each via one or more enactments that represent it. The ENM 20 interacts with the emergent foundations of the participant's world, working with numinous aspects of WEE 118, WIE 120, WLE 122, and SPC 124. Imagery and sound within a specific enactment are of numinous content that affects all of the above areas. Mythic personifications (agents as above) are numinous metaphors for emergent experience and thus serve to focus on corresponding processes within fullness of the participant's experience. Mythic images and sound-patterns such as mantrams or chants, respectively, interact with WLE 122 and SPC 124, and therefore can change fundamental aspects of the participant's experience; numinous metaphor, appropriately participated with, can modify the content of the participant's world.

Thus participation with mythic enactments—achieved via the combined actions of the EAM 12, the FAM 16, and the ENM 20—can affect and shape the user's awareness of numinous emergence that continually creates his or her world of experience and, can thereby be of assistance in his or her mythic life quest and openness to numinous facets of experience.

In order to be considered a depth system for the present invention, a system of mythic endeavor must (a) be capable of interpretation as viewing personal worlds to be emerging or radiating from a numinous Source of Realms SOR 126, (b) view each person's world as emergent and unique, (c) be interpretable in natural ways in terms of WEE 118, WIE 120, WLE 122, and SPC 124 as described above, (d) work toward life goals or purposes that have a spiritual basis; and (e) incorporate methodology for attaining the goals via numinous agents, visual imagery, or music-sound structures.

APPLICATIONS

The following outlines representative applications of the present invention. First, major applications are described that involve the EAM 12, the FAM 16, and the ENM 20. Second, emphases of the individual modules are described for several major fields.

Applications Involving All Three Modules

There are numerous applications involving all three modules. These include:

Lifepath exploration and shaping. A person can find mythic events and patterns in earlier and later life history, can seek potential relatedness to depth systems of meaning, and can explore ways to participate with nurturing dimensions of mythic systems. This could incorporate genetic counseling.

Spiritual quest. A spiritual seeker can participate with depth systems as paths for meditation and inner quest, and can study and directly explore such systems through guidance by the present invention. A way is offered for an aspirant to record and review the mythic enactments he or she engages in and experiences.

Drug rehabilitation. The present invention system is a means to replace drug addiction or dependency with alternative, nurturing experience that is deeply rooted in the person's life history and potential new aspiration. Change can occur at inner experiential roots of addiction via healing, mythic symbolism.

Hospice care (cancer and AIDS). In similar fashion to drug rehabilitation, the present invention may be used to enhance, encourage, and strengthen a terminally ill patient's inner resources approaching the transition of death with dignity and a sense of numinous, continuing life.

Cross-cultural communication. Through use of the present invention, persons in different cultures can explore one another's cultural roots reflecting deep levels of mythic symbolism, enhancement of life, and aspiration. They can gain respect for the traditions involved.

Performance art with scatability. The present invention can be a vehicle for participatory, mythic art performance with arbitrary "scaling" of size and content. Processes and entities on subatomic, atomic, molecular, human, planetary, solar, or galactic scale can be incorporated.

Information networks of mythic servers. The present invention modules can be distributed through a network such as the Internet, in a client/server sense; network clients can utilize server nodes, e.g., distributed ENM 20 server nodes dedicated to specific depth systems to create mythic virtual realities.

General virtual realities with mythic content. The present invention can be used to create virtual realities based on depth systems other than those normally recognized. The depth system concept may be a foundation for many virtual worlds, allowing their thorough and consistent creation.

Individual Module Applications Per Major Fields

Self-Fulfillment

The participant uses the EAM 12 to find significant events in his or her life, according to a broad framework of possibilities; and to understand the texture of his or her experience as being useful for shaping "relatedness to world". This is accomplished for the participant's own exploration.

A participant uses the FAM 16 to become familiar with depth systems, and enactments within them, that are of interest to him or her, and can in this way determine helpful approaches to life and experience. This can lead to new approaches to tangibility and fullness of life based on an authentic search.

A participant uses the ENM 20 to explore experience of a depth system through its realization via a specific enactment. In result, he or she can be guided by the power of the particular depth system, which can lead to finding direction in life via mythic participation. Many systems may be explored.

A person can find mythic events and patterns in his or her earlier and later life history, can seek potential relatedness to depth systems of meaning, and can explore ways to participate with nurturing dimensions of mythic systems. This could incorporate genetic counseling deeply based on metabiology.

A spiritual seeker can participate with depth systems as paths for meditation and inner quest, and can study and directly explore such systems through guidance by the present invention. A way is offered for an aspirant to record and review the mythic enactments he or she engages in and experiences.

Psychotherapy

The participant, in a therapy setting, uses the EAM 12 to explore his or her private world of significant events and texture of experience, guided by the psychotherapist. Life patterns, symbols of meaning, and modes of existential variables become known to person and therapist. This use can contribute to medical diagnosis.

The participant, guided by the therapist, uses the FAM 16 to become familiar with depth systems symbolism and enactments of expressive value, to be explored subsequently through using the ENM 20. This may be guided by assessment results from the EAM 12. Study of depth systems may occur both in the office and at home.

The participant, through guidance by the therapist, uses the ENM 20 to explore enactments from depth systems by means of direct participation in mythic virtual realities. This has power for involvement and integration processes on an archetypal, mythic level, and can be carried into increasing experiential involvement as desired.

The present invention is a means to replace drug addiction or dependency with alternative, nurturing experience that is deeply rooted in the person's life history and potential new aspiration. Change occurs at inner experiential roots of addiction via healing, mythic symbolism.

Similarly to the approach for drug rehabilitation, the present invention may be used to enhance, encourage, and strengthen a terminally ill patient's inner resources, approaching death with dignity and a sense of continuing, numinous, mythic life.

Education

The EAM 12 identifies individual factors and differences important for depth and direction of the student's learning. Texture of experience suggests effective instructional modes and media; mythic life factors can help to identify directions of personal meaning that are helpful for teaching.

The FAM 16 offers integrated, multimedia, hypertext information for studying depth systems and their enactments, individually and comparatively. This can rest on individual differences identified by the EAM 12, leading to experience realized with the ENM 20. There can be stages related to educational levels.

The ENM 20 offers a way to experience and learn about depth systems and their enactments. The student thus learns about "myth" through participation. This reflects individual differences from the assessment function. The ENM 20 can help overcome the narrowness of understanding and can elicit open, healing exploration.

Through use of the present invention system, persons in different cultures can explore one another's cultural roots reflecting deep levels of mythic symbolism, enhancement of life, and aspiration. Each can learn about and "become" the other in mythic virtual reality terms. They can gain respect for the traditions involved.

Performance Art

The EAM 12 determines the audience's preference for life-patterns and textures to be incorporated into the live performance. Myth-producing patterns suggest avenues of meaning to empower performance, while texture of experience shapes sensory aspects. Both of these areas help to focus the context of performance.

The FAM 16 can be used to focus on a depth system and enactment desired by the audience for performance. This sets meaning and form of expression for a subsequent performance (or can change during performance). Assessment results from the EAM 12 guide selection, allowing focus on a mythic theme.

The ENM 20 can engage the audience in expressive mythic content of performance within mythic virtual reality. Audience and performers thereby share mythic symbolic content during the performance, and share and inhabit the mythic virtual reality. Performance based on multiple mythic themes are possible.

The present invention can be a vehicle for participatory, mythic art performance with arbitrary "scaling" of size and content. Processes and entities on subatomic, atomic, molecular, human, planetary, solar, or galactic scale can be incorporated. Virtual entities can instantiate mythic beings.

Information Networks

Network informational access interfaces can be parameterized according to the user's texture of experience, e.g., personal preferred varieties of space and time. Integrated use of the EAM 12 reads (or "imprints") the user's natural experiential modes, becoming widespread in this use for network interfaces.

Network informational interfaces can be shaped to match a world framework selected by the FAM 16, reflecting context of meaning (depth system) for the participant. Symbolism of network communication occurs within the chosen system of meaning. The FAM 16 imprints world-context for the communications interface.

ENM 20 instances can provide user domains in distributed networks such as the Internet. This allows mythic virtual realities with particular depth systems to be participated with, combined with interfaces shaped via the EAM 12 and the FAM 16. Depth systems become foundations for distributed domains.

The present invention's modules can be distributed through a network such as the Internet, in a client/server sense; network clients can utilize server nodes, e.g., distributed ENM 20 server nodes dedicated to specific depth systems to create mythic virtual realities; distributed EAM 12 servers can offer various kinds of assessment.

Foundation for Virtual Realities

The present invention can be used to create virtual realities based on depth systems other than those normally recognized. The depth system concept may be a foundation for many virtual worlds, allowing their thorough and consistent creation; thus to offer a generational framework.

Any legitimate system of symbolic imagery, and possibly sound, based on depth participation with world-forming processes—ultimately numinous in nature—is a contender for depth system status, in which case mythic virtual realities can be based on it. Since even our normal worlds of experience can be viewed as founded this way, many forms of virtual reality—including visionary ones—can be based on the depth system concept and therefore as may be viewed as having consistent roots rather than haphazard bases. The symbolism of science, taken as metaphor for emergent foundations of observed/experienced phenomena, is a case in point, suggesting a powerful perspective on virtual world foundations.

IMPLEMENTATION

The following paragraphs outline implementations of the present invention. There is a considerable range of potential computer architectures involved due to the manifold nature of the present invention's applications. Therefore, implementation is described in terms of system levels and levels of architecture for the present invention. The following system levels (levels of functional ability and inclusiveness) are identified:

S1: personal system units, travelling with users
S2: home/office systems, consulted by users
S3: special services centers, visited by users
S4: distributed services, consulted by users Similarly, several architecture levels (number and distribution of processors/servers) are identified:

A1: uniprocessor
A2: multiprocessor, not a LAN
A3: local area network (LAN) of servers
A4: clients/servers within a wide area network (WAN)

The multiprocessor architecture is accomplished via a local bus or channel-to-channel structure. The local area network (LAN) architecture is accomplished in ways that recognize Open Systems Interconnection (OSI) standards, e.g., using IEEE link-level protocol architectures (Ethernet, token ring, etc.). The wide area network (WAN) architecture is accomplished in ways that recognize open systems standards; e.g., via Internet and World Wide Web services based on Transmission Control Protocol/Internet Protocol (TCP/IP) standards, or comparable networks based on Open Systems Interconection (OSI) standards, or as reflecting emerging international network technologies such as broadband ISDN, ATM, frame relay, or FDDI technologies.

It is assumed that each instance of a level of architecture has an appropriate bus structure and needed complement of hard disk storage, random access memory, diskette drives, monitor, input devices such as keyboard, mouse, track ball, touch screen or light pen, and needed output devices, and virtual reality interaction means within either a windowing or non-windowing environment.

TABLE 3

Architectures Vs. System-Levels

|    | A1 | A2 | A3 | A4 |
|----|----|----|----|----|
| S1 | X  | —  | —  | —  |
| S2 | X  | X  | X  | —  |
| S3 | —  | —  | X  | X  |
| S4 | —  | —  | —  | X  |

This matrix indicates that:

(1) personal units (S1) would be implemented as a uniprocessor architecture incorporating instances of the EAM 12, the FAM 16, and the ENM 20, and the EXM 22 as needed (2) home/office systems (S2) would be implemented as a uniprocessor or multiprocessor architecture, or via a LAN architecture of client/server nodes incorporating instances of the EAM 12, the FAM 16, and the ENM 20, and the EXM 22 as needed (3) special service centers (S3) would be implemented as LAN architectures of client/server nodes, or via WAN-distributed client/server nodes incorporating instances of the EAM 12, the FAM 16, and the ENM 20, and the EXM 22 as needed (4) distributed servers (S4) would be implemented as WAN-distributed client/server nodes incorporating instances of the EAM 12, the FAM 16, and the ENM 20, and the ENM 20, and the EXM 22 as needed Multimedia technology for the present invention includes software support for high-capacity input devices such as compact disks or laser disks; and input capabilities such as touch screens, hypertext regions, or light pens. Included are multimedia output capabilities for text, computer graphics, animation, still video or moving video, and capability for music-sound either recorded or generated in real-time. Data base technology utilizes symbolic query language (SQL) structure and use. Virtual reality technology can involve gloves and goggles, motion and position sensors. It can also involve responsive environments applying image pattern analysis to determine the unencumbered participant's location and movement, and associated interaction with visual and sound environments generated in real-time as aspects of the environment.

The UOS 24 is configured as a foundation for the present invention in a given application. UOS 24 for Windows-based applications may use Windows, or Windows NT for distributed operations. Non-Windows-based applications would use more general approaches to choice of the UOS 24 and its services.

The expert systems EAES 72, FAES 78, and ENES 86 are generated by commercial software generation tools; they are nominally rule-based and can incorporate fuzzy logic. By extension they can include neural networks capable of learning approaches to assessment, facilitation, and enaction.

Other programs of the present invention are implemented in the C language or an equivalent language: EAMEM 74, and EAEC 76 in the EAM 12; FAMEM 80, FAEMOE 82, and FAEC 84 in the FAM 16; and ENVREM 88, ENEMOD 90, and ENEC 92 in the ENM 20. The executive module EXM 22 (specifically programs EXMPOM 96, EXVRPOM 98, EXMGPOM 100, and EXEPOM 96) can also be implemented in C.

Specific applications determine service request call interfaces within and between the four modules. These include:
a. expert systems calls to other programs in the same modules, i.e., calls from EAES 72 to EAMEM 74 and EAEC 76 in the EAM 12; calls from FAES 78 to FAMEM 80, FAEMOE 82, and FAEC 84 in the FAM 16; and calls from ENES 86 to ENVREM 88, ENEMOD 90, and ENEC 92 in the ENM 20
b. calls to the EXM 22 from other modules, i.e., calls from EAMEM 74 and FAMEM 80 to EXMPOM 96 in the EXM 22; from FAEMOE 82 and ENEMOD 90 to EXMGPOM 100 in the EXM 22; from ENVREM 88 to EXVRPOM 98 in the EXM 22; from EAEC 76, FAEC 84, and ENEC 92 to EXEPOM 94 in the EXM 22
c. calls within the EXM 22, i.e., from EXMPOM 96, EXMGPOM 100, and EXVRPOM 98 to EXEPOM The module structure of the present invention is generic and applicable to the full range of applications. All modules are required for all applications. The present invention is focussed for any specific application by choosing appropriate hardware and software complementary to the modules of the present invention; as well as by installing appropriate versions of the rule base files ENRULE 40, FARULE 42, and ENRULE 44, and the digital sound and image files EADIS 46, FADIS 48, and ENDIS 50. These files are tailored to specific applications of the present invention.

EARULE 40 determines the detailed MLP and TOE assessment logic and interaction for the EAM 12; FARULE 42 determines the detailed facilitation logic and interaction for the FAM 16; and ENRULE 44 determines the detailed virtual-reality logic and interaction for the ENM 20. In parallel to this, EADIS 46 determines the detailed multimedia interface for the EAM 12; FADIS 48 determines the detailed multimedia interface for the FAM 16; and ENDIS 50 determines the detailed virtual-reality interface for the ENM 20. Actualities of specific virtual reality systems are absorbed in drivers within the UOS 24, the ENM 20 program ENVREM 88, and the EXM 22 programs EXVRPOM 98 and EXEPOM 94. The libraries EXD-GEN 30, END-GEN 34, and ENA-GEN 38 of generic existential, enactment, and actualization descriptors, respectively, can be extended or reduced to meet the needs of specific applications.

The architecture of the present invention is powerful in allowing one comprehensive, generic design to apply to the full range of applications.

Obviously, many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. A computer-based system for allowing a person to experience systems of mythology within virtual reality environments generated by the computer system, comprising:
   a) an existential analyzer module (EAM), for assessing a portion of a person's meaningful experiential world, said EAM generating an existential descripter (EXD) data structure describing said assessments, said EAM comprising a computer program executed by the computer system and residing on a direct access storage device (DASD) or in internal memory, said EXD data structure residing on a direct access storage device (DASD) or in internal memory, with said EAM creating and accessing said EXD data structure;
   b) a facilitator module (FAM) for utilizing said assessment from said EXD data structure for determining at least one appropriate enactment, said FAM generating at least one enactment descripter (END) data structure describing said at least one enactment, said FAM comprising a computer program executed by the computer system and residing on a direct access storage device (DASD) or in internal memory, said END data structure residing on a direct access storage device (DASD) or in internal memory, with said FAM creating and accessing said END data structure; and,
   c) an enactor module (ENM) for utilizing information from said EXD data structure and from said at least one END data structure to generate a mythic virtual reality that incorporates said chosen at least one enactment, said ENM comprising a computer program executed by the computer system and residing on a direct access storage device (DASD) or in internal memory.

2. The system of claim 1, wherein said EAM, FAM and ENM comprise a computer-based system.

3. The system of claim 1, further including:
   an operating system; and
   an executive module (EXM) in communication with said operating system so as to provide an internal control interface between said operating system and said EAM, FAM and ENM, said EXM providing scheduling and resources management services.

4. The system of claim 3, wherein said EXM, comprises:
a multimedia primitive operations manager (EXMPOM) for providing a basic set of operations needed to manage user multimedia interfaces;
a mythic generation primitive operations manager (EXMGPOM) for providing a basic set of operations needed to encode enactment descriptions for said FAM, decode enactment descriptions for said ENM, and determine and suggest enactment entities and events that are consistent with the depth system in force for a mythic virtual reality being generated by said ENM.
a virtual reality primitive operations manager (EXVRPOM) for providing a basic set of operations needed to manage user virtual reality interfaces; and
an executive primitive operations manager (EXEPOM) for providing a basic set of operations needed to drive operating system executive services.

5. The system of claim 4, wherein said EAM, comprises:
an existential analyzer expert system (EAES) for providing said assessment of said portion of a person's meaningful experiential world.

6. The system of claim 5, wherein said EAM, further comprises:
an existential analyzer multimedia environment manager (EAMEM) in communication with said EXMPOM for providing an EAM portion of a user multimedia interface between the user and said EAES; and
an existential analyzer executive communicator (EAEC) in communication with said EPOM for providing a control interface between said EAM and said operating system.

7. The system of claim 6, wherein said FAM, comprises:
a facilitator module expert system (FAES) for providing said determination of said at least one appropriate enactment.

8. The system of claim 7, wherein said FAM, further comprises:
a multimedia environment manager (FAMEM) in communication with said EXMPOM for providing an FAM portion of said user multimedia interface;
a facilitator module executive communicator (FAEC) in communication with said EXEPOM for providing a control interface between said FAM and said operating system; and
a facilitator module myth-oriented encoder (FAEMOE) in communication with said EXMGPOM for encoding a script for each enactment determined by said FAM.

9. The system of claim 8, wherein said ENM, comprises:
an enactor module expert system (ENES) for providing said utilization of information from said EXD data structure and from said END data structure.

10. The system of claim 9, wherein said ENM, further comprises:
an enactor module virtual reality environment manager (ENVREM) in communication with said EXVRPOM for providing said virtual reality interface;
an enactor module executive communicator (ENEC) in communication with said EPOM for providing a control interface between said ENM and said operating system; and
an enactor module myth-oriented decoder (ENEMOD) in communication with said EXMGPOM for interpreting a previously encoded script for each enactment.

11. The system of claim 1, wherein said EAM assesses mythic life patterns in the person's history, interactively using comparative mythology and existential analysis.

12. The system of claim 1, wherein said EAM assesses the person's texture of experience, interactively applying existential analysis and expressive arts therapies.

13. The system of claim 1, wherein said FAM utilizes said assessment to generate at least one enactment script for describing the form and content of said at least one enactment, said enactment script being a portion of said END.

14. The system of claim 1, further comprising:
a plurality of generic existential descripter (EXD-GEN) data structures describing canonical personal world descriptions for use in generating said EXD data structure; and
a plurality of generic enactment descripter (END-GEN) data structures describing canonical mythic world descriptions for use in generating said at least one END data structure.

15. The system of claim 1, wherein said ENM generates at least one enactment actualizer (ENA) data structure, each being associated with a corresponding END data structure, each ENA data structure describing significant aspects of the real-time enactment of said corresponding END data structure.

16. The system of claim 15, further comprising:
a plurality of generic enactment actualizer (ENA-GEN) data structures describing canonical enactment actualizations for use in generating said ENA data structures.

17. The system of claim 16, wherein said EAM and said FAM utilize information from said plurality of said ENA data structures for generating said EXD data structure and said at least one END data structure.

18. The system of claim 1, wherein said EAM utilizes information from said at least one END data structure for generating said EXD data structure.

19. A computer-based system for determining awareness of new mythic patterns within virtual reality environments generated by the computer system, comprising: a plurality of computer-based subsystems for allowing persons to experience systems of mythology, each such subsystem comprising:
a) an existential analyzer module (EAM), for assessing a portion of a person's meaningful experiential world, said EAM generating an existential descripter (EXD) data structure describing said assessments, said EAM comprising a computer program executed by the computer system and residing on a direct access storage device (DASD) or in internal memory, said EXD data structure residing on a direct access storage device (DASD) or in internal memory, with said EAM creating and accessing said EXD data structure; b) a facilitator module (FAM) for utilizing said assessment from said EXD data structure for determining at least one appropriate enactment, said FAM generating at least one enactment descripter (END) data structure describing said at least one enactment chosen from said FAM, said FAM comprising a computer program executed by the computer system and residing on a direct access storage device (DASD) or in internal memory, said END data structure residing on a direct access storage device (DASD) or in internal memory, with said FAM creating and accessing said END data structure; and, c) an enactor module (ENM) for utilizing information from said EXD data structure and from said at least one END data structure to generate a mythic virtual reality that incorporates said chosen at least one enactment, said ENM comprising a computer program executed by the computer system and residing on a direct access storage device (DASD) or in internal memory;

intelligence means within each said subsystem for detecting and reporting new mythic patterns arising as aspects of mythic exploration by participants via interaction with a subsystem; and networked data communication means between said plurality of subsystems for allowing each such subsystem to report to desired remaining subsystems information about said detected new mythic patterns, and to receive such reports from desired remaining subsystems.

* * * * *

UNITED STATES PATENT AND TRADEMARK OFFICE
CERTIFICATE OF CORRECTION

PATENT NO. : 5,734,795
DATED : Mar. 31, 1998
INVENTOR(S) : McCagie, Rogers

It is certified that error appears in the above-indentified patent and that said Letters Patent is hereby corrected as shown below:

Column 2, Line 52, before ""Dionysian" insert -- ( --.

Column 9, Line 65, delete "Model" and substitute therefor -- Module --.

Column 12, Line 45, below Table 2 insert -- *"Calling" is via executive services. --.

Column 13, Line 33, delete "03" and substitute therefor -- 0→ --.

Column 44, Line 46, above Table 3 insert -- Principal intersections of these levels are shown below in Table 3 (an X means applicable). --.

Signed and Sealed this

Fourteenth Day of July, 1998

*Attest:*

BRUCE LEHMAN

*Attesting Officer*     *Commissioner of Patents and Trademarks*